US009568186B2

(12) United States Patent
Brown

(10) Patent No.: US 9,568,186 B2
(45) Date of Patent: Feb. 14, 2017

(54) CONTAINER APPARATUS AND METHOD OF USING SAME

(71) Applicant: LIT Coolers, LLC, Decatur, AL (US)

(72) Inventor: Matthew S. Brown, Faulkner, MS (US)

(73) Assignee: LIT Coolers, LLC, Decatur, AL (US)

( * ) Notice: Subject to any disclaimer, the term of this patent is extended or adjusted under 35 U.S.C. 154(b) by 0 days.

(21) Appl. No.: 14/862,941

(22) Filed: Sep. 23, 2015

(65) Prior Publication Data

US 2016/0010845 A1 Jan. 14, 2016

Related U.S. Application Data

(63) Continuation-in-part of application No. 14/534,110, filed on Nov. 5, 2014, which is a continuation-in-part
(Continued)

(51) Int. Cl.
*B60Q 1/44* (2006.01)
*F21V 33/00* (2006.01)
(Continued)

(52) U.S. Cl.
CPC ............ *F21V 33/008* (2013.01); *B65D 25/02* (2013.01); *B65D 43/16* (2013.01); *B65D 81/18* (2013.01);
(Continued)

(58) Field of Classification Search
CPC F21V 33/008; F21V 33/0084; F21V 33/0044; B65D 25/02; B65D 81/18; B65D 43/16; F25D 3/08; F25D 27/00
See application file for complete search history.

(56) References Cited

U.S. PATENT DOCUMENTS 4,984,760 A 1/1991 Cohn et al.
6,182,462 B1 2/2001 Bania et al.
(Continued)

FOREIGN PATENT DOCUMENTS

RU 54138 U1 6/2006
RU 78632 U1 12/2008

OTHER PUBLICATIONS

International Search Report and Written Opinion of the International Searching Authority for International Application No. PCT/US2014/056433.
(Continued)

*Primary Examiner* — Stephen F Husar
*Assistant Examiner* — Danielle Allen
(74) *Attorney, Agent, or Firm* — Ashley Law Firm P.C.; Stephen S. Ashley, Jr.

(57) ABSTRACT

A container apparatus can include a container and an insert assembly. The insert assembly can include four elongate members. The four elongate members can include light emitting devices for illuminating the interior of the container and/or temperature altering elements for cooling and/or heating the interior of the container. The container can have a rectangular base and a rectangular sidewall extending upwardly from the base. The sidewall can define four corners of the container, and four elongate recesses can be formed in the sidewall proximate the four corners of the sidewall to receive the elongate light members. The recesses can be sized and shaped to conform to the elongate insert members so that the insert members can be releasably retained within the elongate recesses.

20 Claims, 21 Drawing Sheets

Related U.S. Application Data of application No. PCT/US2014/056433, filed on Sep. 19, 2014, and a continuation-in-part of application No. 14/031,260, filed on Sep. 19, 2013, now Pat. No. 8,931,910.

(51) Int. Cl.

| | |
|---|---|
| ***B65D 43/16*** | (2006.01) |
| ***B65D 25/02*** | (2006.01) |
| ***B65D 81/18*** | (2006.01) |
| ***F25D 27/00*** | (2006.01) |
| *F25D 3/08* | (2006.01) |

(52) U.S. Cl.

CPC .......... *F21V 33/0044* (2013.01); *F25D 27/00* (2013.01); *F25D 3/08* (2013.01)

(56) References Cited

U.S. PATENT DOCUMENTS

| | | | | |
|---|---|---|---|---|
| 7,080,920 | B2 | 7/2006 | Fitzsimmons et al. | |
| 7,645,047 | B2 * | 1/2010 | Martinez | F21S 9/022 362/147 |
| 7,722,204 | B1 | 5/2010 | Sandberg | |
| 7,984,997 | B1 * | 7/2011 | Sandberg | F21V 23/04 362/101 |
| 8,210,702 | B1 | 7/2012 | Sandberg | |
| 8,511,846 | B1 | 8/2013 | Sandberg | |
| 2003/0081408 | A1 | 5/2003 | Tai | |
| 2007/0103895 | A1 | 5/2007 | Riesebosch | |
| 2007/0206372 | A1 | 9/2007 | Casillas | |
| 2013/0033854 | A1 | 2/2013 | Statham | |

OTHER PUBLICATIONS

The International Bureau of WIPO, International Preliminary Report on Patentability in International Application No. PCT/US2014/056433, Mar. 22, 2016.

espacenet.com, English translation of abstract of RU54138U1, Apr. 1, 2016.

espacenet.com, English translation of abstract of RU78632U1, Apr. 1, 2016.

* cited by examiner

CONTAINER APPARATUS AND METHOD OF USING SAME

CROSS REFERENCE TO RELATED APPLICATIONS

This application is a continuation-in-part of U.S. patent application Ser. No. 14/534,110, filed Nov. 5, 2014, which is a continuation-in-part of International Application No. PCT/US2014/056433, filed Sep. 19, 2014, which claims priority to U.S. patent application Ser. No. 14/031,260, filed Sep. 19, 2013, which is now U.S. Pat. No. 8,931,910. In addition, U.S. patent application Ser. No. 14/534,110, filed Nov. 5, 2014, is a continuation-in-part of U.S. patent application Ser. No. 14/031,260, filed Sep. 19, 2013, now U.S. Pat. No. 8,931,910. All of said applications are incorporated herein by reference.

TECHNICAL FIELD AND BACKGROUND OF INVENTION

The present invention relates to a container apparatus. One embodiment of the invention comprises an insulated cooler that is adapted to receive a removable lighting assembly. The lighting assembly can be secured in the cooler so that it does not move during use, and can be easily removed from the cooler when desired.

It is common when using a container, such as an insulated cooler or toolbox, for the user to desire a light to illuminate the interior of the container. For example, such a light can aid the user in getting a certain food item contained in a cooler or a particular tool in a toolbox at night or in a dimly lit area. Attempts have been made in the prior art to address this need. However, many such prior art devices comprise containers in which lights are electrically wired to the container itself. Such a system can be relatively expensive, and if the lights fail it is generally difficult and impractical to repair. Also, it can be relatively difficult to replace batteries in such containers.

SUMMARY OF INVENTION

Therefore, one object of the present invention is to provide a container apparatus that can receive and engage an assembly for illuminating the interior of the container. Another object of the invention is to provide a container apparatus having an interior lighting assembly that can be easily removed from the container when desired. Yet another object of the invention is to provide a container apparatus having an interior lighting assembly that need not be functionally connected to the container. Yet another object of the invention is to provide a container apparatus having a removable insert assembly comprising a temperature altering element for cooling the interior of the container. These and other objects of the present invention can be achieved in various embodiments of the invention described below.

One embodiment of the invention comprises a container apparatus comprising an enclosure having an interior surface, and at least one substantially concave recess formed in the interior surface sized and shaped to receive and engage a light assembly for illuminating an interior area of the enclosure.

According to another embodiment of the invention, the enclosure comprises a rectangular base and a rectangular sidewall extending upwardly from the base defining four corners of the enclosure.

According to another embodiment of the invention, at least one elongate recess is formed at one of the four corners defined by the sidewall.

According to another embodiment of the invention, the container apparatus includes a light assembly having at least one elongate light member, which is positioned within the elongate recess.

According to another embodiment of the invention, each elongate light member comprises a cooling or heating element. The cooling or heating element can be battery powered.

According to another embodiment of the invention, the container apparatus includes at least one elongate member positioned within the elongate recess. The elongate recess comprises a cooling or heating element. The cooling or heating element can be battery powered.

According to another embodiment of the invention, four elongate recesses are formed at the four corners defined by the sidewall.

According to another embodiment of the invention, four elongate light members are positioned within the four elongate recesses.

According to another embodiment of the invention, the rectangular sidewall comprises an outer wall section and an inner wall section, the inner wall section having an upper edge positioned below an upper edge of the outer wall section, such that the upper edge of the inner wall section defines a rest platform.

According to another embodiment of the invention, four elongate recesses are formed at the four corners of the sidewall. The elongate recesses begin at the upper edge of the inner wall section and extending downwardly to the base.

According to another embodiment of the invention, the container apparatus includes a light assembly comprising a rectangular frame having a perimeter approximately equal to a perimeter defined by the rest platform and defining four corners corresponding to the corners of the enclosure, and four elongate light members extend downwardly from the rectangular frame member. The light members are attached at the corners of the frame and are positioned within the four elongate recesses of the enclosure.

According to another embodiment of the invention, the rectangular frame of the light assembly rests on the rest platform of the enclosure.

According to another embodiment of the invention, the enclosure is a thermally insulated cooler.

According to another embodiment of the invention, the container apparatus includes a lid pivotally attached to the enclosure. The lid can be operatively connected to the light assembly, such that the light assembly emits light when the lid is opened.

According to another embodiment of the invention, the container apparatus includes a lid having a transparent or translucent section. As such, light emitting from the light assembly can be visible through the lid.

According to another embodiment of the invention, the enclosure is a tool box.

According to another embodiment of the invention, a substantially circular shaped recess is formed in the base of the enclosure.

According to another embodiment of the invention, a light assembly comprising a circular shaped light is positioned within the circular recess. At least one attachment member is connected to a bottom surface of the light and is releasably attached to the base of the enclosure.

According to another embodiment of the invention, the attachment member is a suction cup, and a plurality of suction cups are connected to a bottom surface of the light.

Another embodiment of the invention comprises a container kit comprised of a light assembly having four elongate light members, and a container. The container can comprise a rectangular base and a rectangular sidewall extending upwardly from the base. The sidewall defines four corners of the container, and four elongate recesses are formed in the sidewall proximate the four corners of the sidewall to receive the elongate light members. The recesses are sized and shaped to conform to the elongate light members so that the light members can be releasably retained within the elongate recesses.

According to another embodiment of the invention, the rectangular sidewall comprises an outer wall section and an inner wall section. The inner wall section has an upper edge positioned below an upper edge of the outer wall section, such that the upper edge of the inner wall section defines a rest platform.

According to another embodiment of the invention, the light assembly includes a rectangular frame having a perimeter approximately equal to the perimeter of the rest platform, and has four corners corresponding to the corners of the container. The four elongate light members are attached at the four corners of the frame, and the rectangular frame rests on the rest platform of the container.

A container apparatus according to another preferred embodiment of the invention comprises an enclosure having a base and at least one sidewall extending upwardly from the base. At least one recess is formed in an interior surface of the enclosure, and is sized and shaped to receive and engage a light assembly for illuminating an interior area of the enclosure. A lid can be pivotally attached to the sidewall and moveable between a closed position, in which the lid covers the interior of the enclosure and an open position, in which the interior of the enclosure is open and exposed. The lid can have an opening formed therethrough and a translucent or transparent insert section positioned within the opening, so that light emitted by the light assembly is visible through the insert section when the lid is in the closed position.

According to another embodiment of the invention, the insert section can have a logo formed thereon, such that the logo is illuminated by light emitted from the light assembly.

Another embodiment of the invention comprises a method of illuminating a container interior that includes providing a container comprising an interior surface having at least one recess formed therein, and a light assembly comprising at least one light member adapted to be received and retained within the recess. The light member is inserted into the recess and illuminates the interior area of the container. The light assembly can be removed from the container by pulling the light member out of the recess.

A container apparatus according to another embodiment of the invention comprises an enclosure defining an interior area and a light assembly adapted for illuminating the interior area. A substantially concave recess is formed in the interior surface of the enclosure and is adapted for receiving and maintaining the light assembly therein.

According to another embodiment of the invention, the enclosure comprises a body section and a lid section connected to the body section.

According to another embodiment of the invention, the substantially concave recess is formed in the lid section.

According to another embodiment of the invention, the substantially concave recess is formed in the body section.

According to another embodiment of the invention, the light assembly comprises at least one light emitting device selected from the group consisting of a light emitting diode, an incandescent light bulb, and an illuminated fiber optic cable.

According to another embodiment of the invention, the enclosure is comprised of a body section and a lid section. The body section comprises a substantially rectangular base and a substantially rectangular sidewall extending upwardly from the base, and the lid section is pivotally connected to the sidewall of the body section. The substantially concave recess can be formed in the interior surface of the lid section.

According to another embodiment of the invention, the enclosure comprises a body section comprising a substantially rectangular base and a substantially rectangular sidewall having a top edge, and the substantially concave recess is formed in the top edge of the sidewall.

According to another embodiment of the invention, the light assembly comprises a substantially rectangular frame adapted for positioning in the recess formed in the top edge of the sidewall, and at least one light emitting device positioned within the frame.

According to another embodiment of the invention, the enclosure comprises a base for positioning substantially horizontally on a floor surface and a sidewall extending substantially vertically from the base. The substantially concave recess comprises a first channel formed in an interior surface of the sidewall and a complementary second channel formed in the interior surface of the sidewall at a position opposed to the first channel, the first channel and the second channel extending substantially vertically from proximate a top of the sidewall to proximate a bottom of the sidewall.

According to another embodiment of the invention, the light assembly comprises a substantially flat member received in the first channel and the second channel and adapted for sliding movement therein, such that the light assembly can provide a barrier dividing the interior area defined by the enclosure into a first interior area and a second interior area.

According to another embodiment of the invention, the base is substantially rectangular and the sidewall is substantially rectangular. The sidewall comprises first and second opposed sides and third and fourth opposed sides. The first channel is formed in the first side and the second channel is formed in the second side.

A container apparatus according to another embodiment of the invention comprises a body section comprising a base and at least one sidewall extending upwardly from the base, a light emitting device adapted for illuminating at least a portion of the container apparatus, and a lid section pivotally attached to the sidewall. The lid is moveable between a closed position in which the lid covers an interior area of the body and an open position in which the interior area of the body is exposed. The lid has an opening formed therethrough and an insert section positioned within the opening. The insert section is translucent or transparent, such that light emitted by the light assembly is visible through the insert section when the lid is in the closed position.

A container apparatus according to another embodiment of the invention comprises an enclosure defining an interior area, and at least one substantially concave recess formed in the interior surface of the enclosure. The recess is adapted for receiving and maintaining an insert assembly therein.

According to another embodiment of the invention, the apparatus includes an insert assembly. The insert assembly can be comprised of a light emitting device adapted for illuminating the interior area of the enclosure, an audio speaker adapted for emitting sound, and/or a dry box container adapted for storing items.

According to another embodiment of the invention, the insert assembly can be comprised of at least one temperature altering element. The temperature altering element can be a cooling element adapted for cooling the interior area of the enclosure and/or a heating element adapted for heating the interior area of the enclosure.

According to another embodiment of the invention, the enclosure comprises a body comprising a substantially rectangular base and a substantially rectangular sidewall extending upwardly from the base defining four corners of the body, and wherein the at least one recess comprises four recesses formed at said four corners.

According to another embodiment of the invention, the enclosure further comprises a lid pivotally connected to the body.

According to another embodiment of the invention, the apparatus includes an insert assembly comprising four elongate insert members positioned within the four recesses. Each of the four elongate insert members comprises at least one temperature altering element, such as a cooling element or a heating.

According to another embodiment of the invention, the insert assembly includes a substantially rectangular insert member positioned above the four elongate insert members and supported by a top edge of the sidewall. The substantially rectangular insert member includes at least one light emitting device adapted for illuminating the interior area of the enclosure.

According to another embodiment of the invention, one or more recesses can be formed in a vehicle, such as a boat or ship. The recesses can be formed in the ship's hull. Each recess can be sized and shaped to receive and engage a complementary insert member. Each insert member can be comprised of a battery powered light emitting device for illuminating the water around the ship. The light emitting devices can project light of various colors. Wireless technology, such as the wireless communication technology sold under the mark "BLUETOOTH", can be used to operatively connect the light emitting devices to a remote control that can turn the light emitting devices on and off.

DESCRIPTION OF PREFERRED EMBODIMENTS OF THE INVENTION AND BEST MODE

Figure 1:
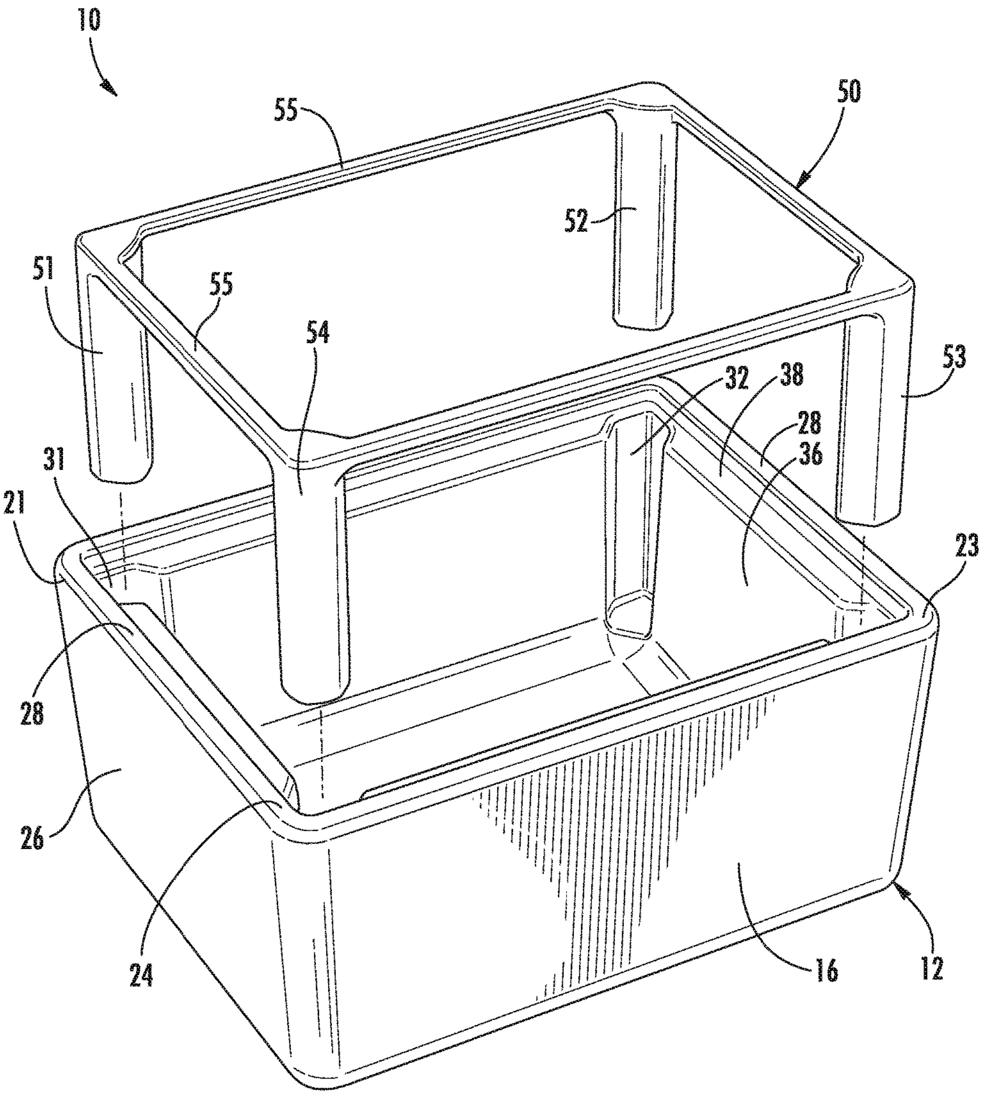
FIG. 1 is a perspective view of a container apparatus of according to a preferred embodiment of the invention.
Figure 2:
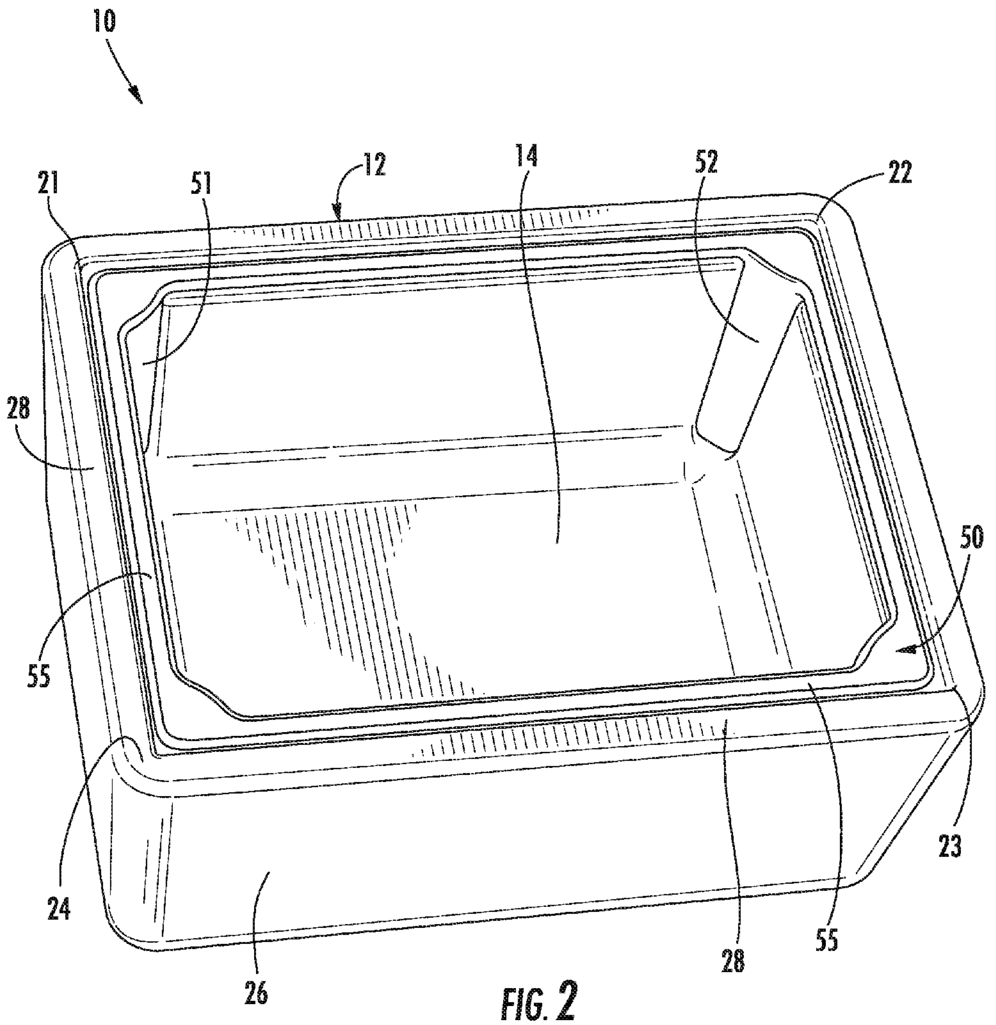
FIG. 2 is another perspective view of the container apparatus of FIG. 1.
Figure 3:
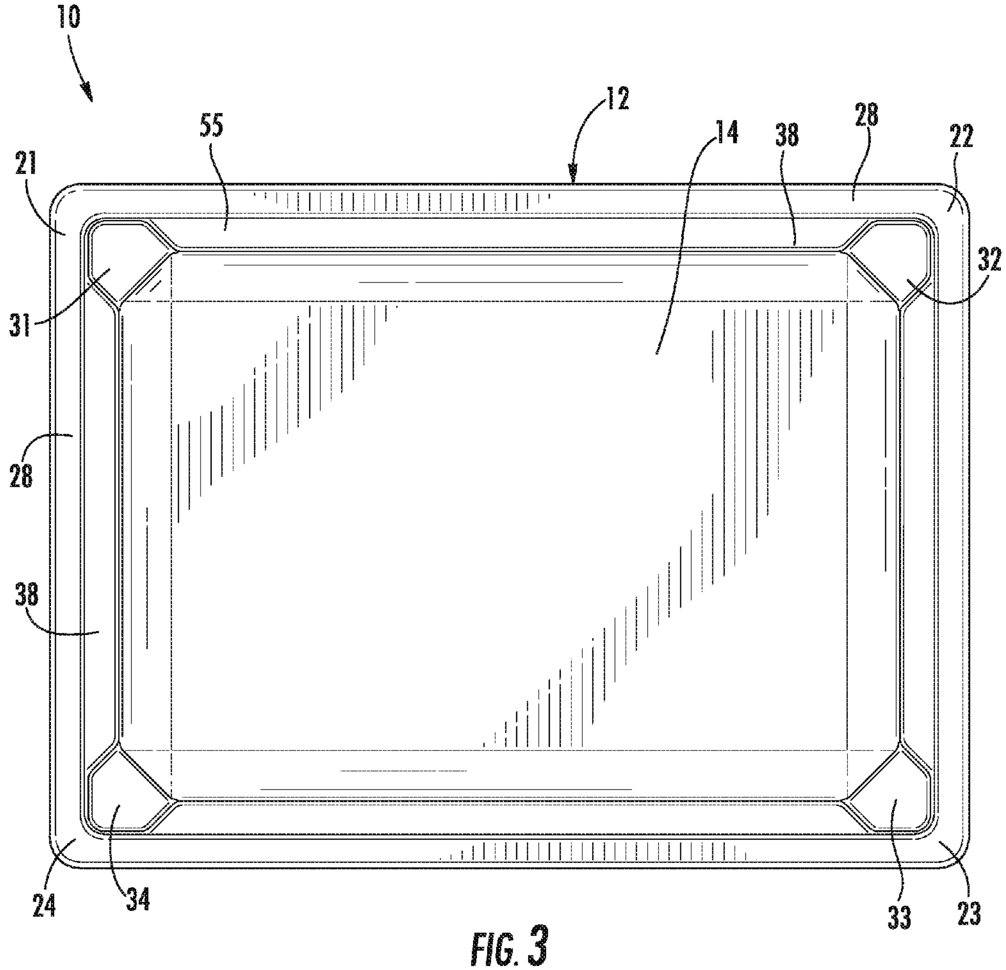
FIG. 3 is a top plan view of the container apparatus of FIG. 1, without a light assembly.

A container apparatus according to a preferred embodiment of the invention is illustrated in FIGS. 1-3, and shown generally at reference numeral 10. As shown in FIG. 1, the apparatus 10 comprises a container 12 and a light assembly insert 50. The word "container" as used herein refers generally to any kind of enclosure. For example, the apparatus 10 can comprise a thermally insulated cooler adapted for storing food and beverages. Alternatively, the container 10 can comprise a tool box for storing tools, or other type of enclosure.

As shown in FIGS. 1-3, the container 12 comprises a substantially rectangular base 14, and a substantially rectangular sidewall 16 extending upwardly from the base 14. The sidewall 16 has four sides defining four corners 21, 22, 23, 24. The sidewall 16 is comprised of an outer wall section 26 and an inner wall section 36, as shown in FIGS. 1 and 2. The surface of the inner wall section 36 defines an interior surface of the container 12. The top 38 of the inner wall section 36 is lower than the top 28 of the outer wall section 26, thereby creating a tiered rest platform 38, as shown in FIG. 1. The container 12 can be made of plastic or other suitable material, and can be made by injection molding or other suitable manufacturing process. It is to be noted that while container apparatus 10 comprises a substantially rectangular container 12, the invention is not so limited. Alternatively, the container 12 can be a variety of shapes, such as substantially circular, oval and square.

Four substantially concave and elongate recesses 31, 32, 33, 34 are formed in the inner wall section 36 proximate the four corners 21, 22, 23, 24, respectively, of the sidewall 16, as shown in FIG. 1. The recesses 31, 32, 33, 34 begin at the top 38 of the inner wall section 36 and extend downwardly to the base 14 of the container 12, as shown at reference numeral 32 in FIG. 1. The recesses 31, 32, 33, 34 can have a substantially pentagonal shape, as shown in FIG. 3.

The light assembly 50 comprises four elongate light members 51, 52, 53, 54 attached to a rectangular top frame 55, as shown in FIG. 1. Each of the four light members 51 are attached at one of the four corners of the rectangular frame 55, and extend downwardly from the rectangular frame member at an angle of about ninety degrees, as shown in FIG. 1.

The elongate recesses 31, 32, 33, 34 in the container 12 are sized and shaped to conform to the elongate light members 51, 52, 53, 54, in order to receive and retain the light members 51, 52, 53, 54 therein. Accordingly, light members 51, 52, 53, 54 have a length approximately equal to the length of the recesses 31, 32, 33, 34 extending from the top 38 of the inner wall section 36 to the base 14, and have a perimeter slightly less than the effective perimeter of the recesses 31, 32, 33, 34, such that the light members 51, 52, 53, 54 can be inserted into the recesses 31, 32, 33, 34, as shown in FIGS. 1 and 2, and retained within the recesses 31, 32, 33, 34 by frictional engagement.

The rectangular frame 55 of the light assembly 50 has a perimeter approximately equal to the perimeter of the rectangular rest platform 38. As such, the frame 55 rests on the rest platform 38 of the inner wall section 36 when the light members 51, 52, 53, 54 are fully inserted into the recesses 31, 32, 33, 34, as shown in FIG. 2. The frame 55 has a height approximately equal to the difference in height between the top edge 28 of the outer wall section 26 and the top edge 38 of the inner wall section 36, such that the top of the frame 55 sits flush with the top 28 of the outer wall section 26 when the light members 51, 52, 53, 54 are fully inserted into the recesses 31, 32, 33, 34, as shown in FIG. 2.

Alternative embodiments can utilize an additional engagement mechanism for facilitating retention of the light members 51, 52, 53, 54 within the recesses 31, 32, 33, 34. For example, a plurality of protuberances can be positioned on the outer surface of the light members 51, 52, 53, 54 to engage a plurality of corresponding openings formed on the portion of the inner wall section 36 defining the recesses 31, 32, 33, 34 when the light members 51, 52, 53, 54 are fully inserted into the recesses 31, 32, 33, 34. The protuberances residing within the openings further retain the light members 51, 52, 53, 54 within the recesses 31, 32, 33, 34. Alternatively, a plurality of protuberances can be formed on the portion of the inner wall section 36 defining the recesses 31, 32, 33, 34 to engage a plurality of corresponding apertures formed in the light members 51, 52, 53, 54 when the light members 51, 52, 53, 54 are inserted into the recesses 31, 32, 33, 34.

Each elongate light member 51, 52, 53, 54 is comprised of a light emitting device, such as a light emitting diode (LED), a low-voltage incandescent light bulb, illuminated fiber optic cables, or other suitable light emitting device. As such, whenever it is desired to illuminate the interior of the container 12, the light assembly 50 is positioned within the container 12 by inserting the light members 51, 52, 53, 54 into the recesses 31, 32, 33, 34, as shown in FIGS. 1 and 2, and turning on the light emitting devices of the light members 51, 52, 53, 54. In an alternative embodiment, each light member 51, 52, 53, 54 can include a battery powered cooling or heating element. In another alternative embodiment, each elongate member 51, 52, 53, 54 comprises a battery powered cooling or heating element, with no light emitting device.

Preferably, the light emitting device is powered by disposable or rechargeable batteries. The light emitting devices can be set on a timer such that they automatically turn off after a certain period of time to avoid draining of the batteries. The light assembly 50 is not wired to or otherwise electrically connected to the container 12, and no electric wiring is located within the container 12. As such, the light assembly 50 can be easily removed from the container 12 to repair a malfunction in one of the light members 51, 52, 53, 54, or replace drained batteries. Also, the light assembly 50 can be removed when there is no desire for illumination within the container 12 or when it is desired to replace the light assembly 50 with a new unit. Since the light assembly 50 is not operatively connected to or functionally dependent upon the container 12, and can be easily removed from the container 12, the light assembly 50 and container 12 can be manufactured, distributed and/or sold as separate units. Alternatively, the light assembly 50 and container 12 can be distributed and/or sold as components of a container kit.

Figure 12:
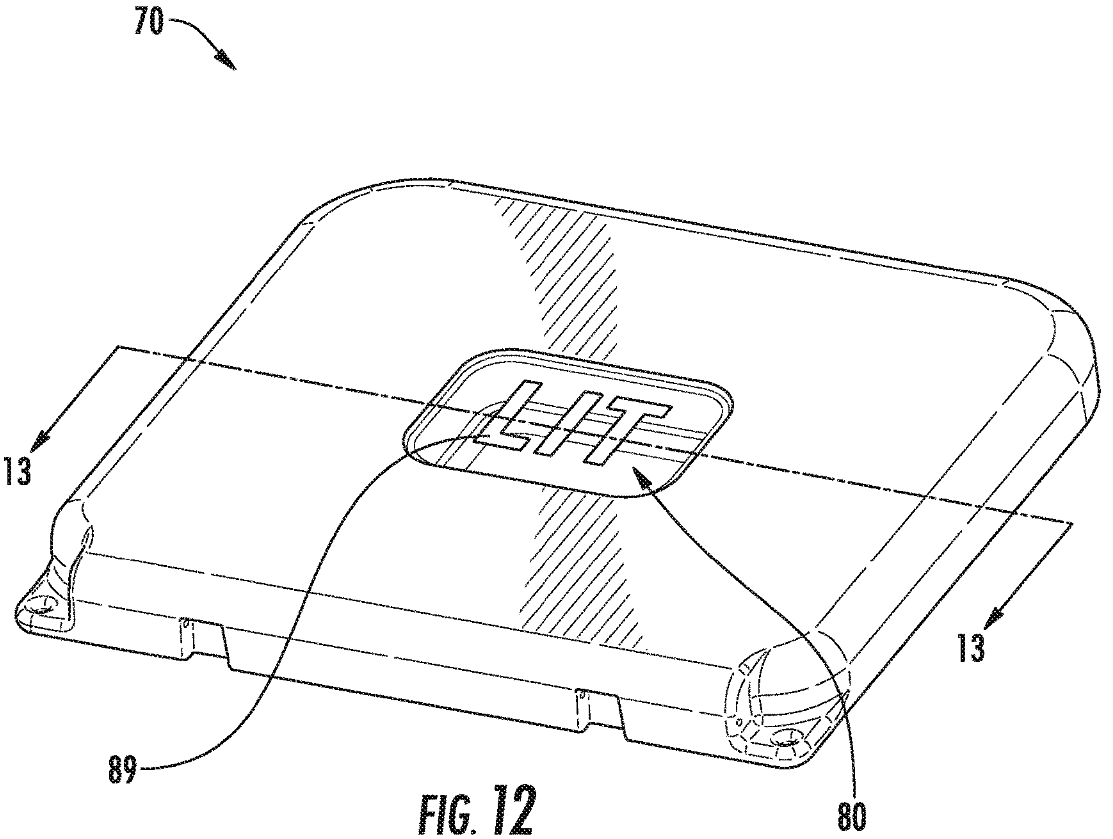
FIG. 12 is a perspective view of a lid portion of a container apparatus according to a preferred embodiment of the invention.
Figure 13:
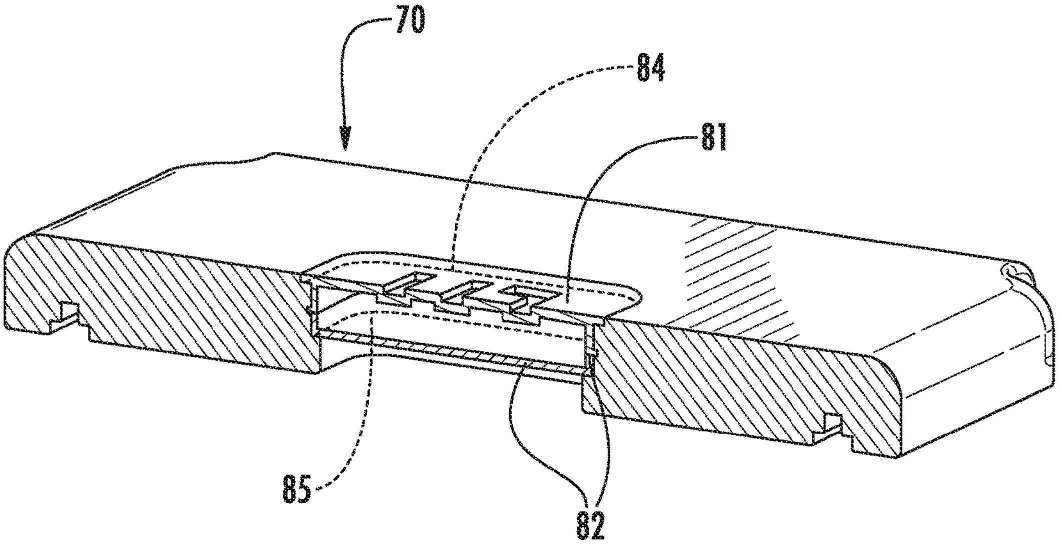
FIG. 13 is a cross sectional perspective view of the lid of FIG. 12, taken along lines 13-13 in FIG. 12.
Figure 14:
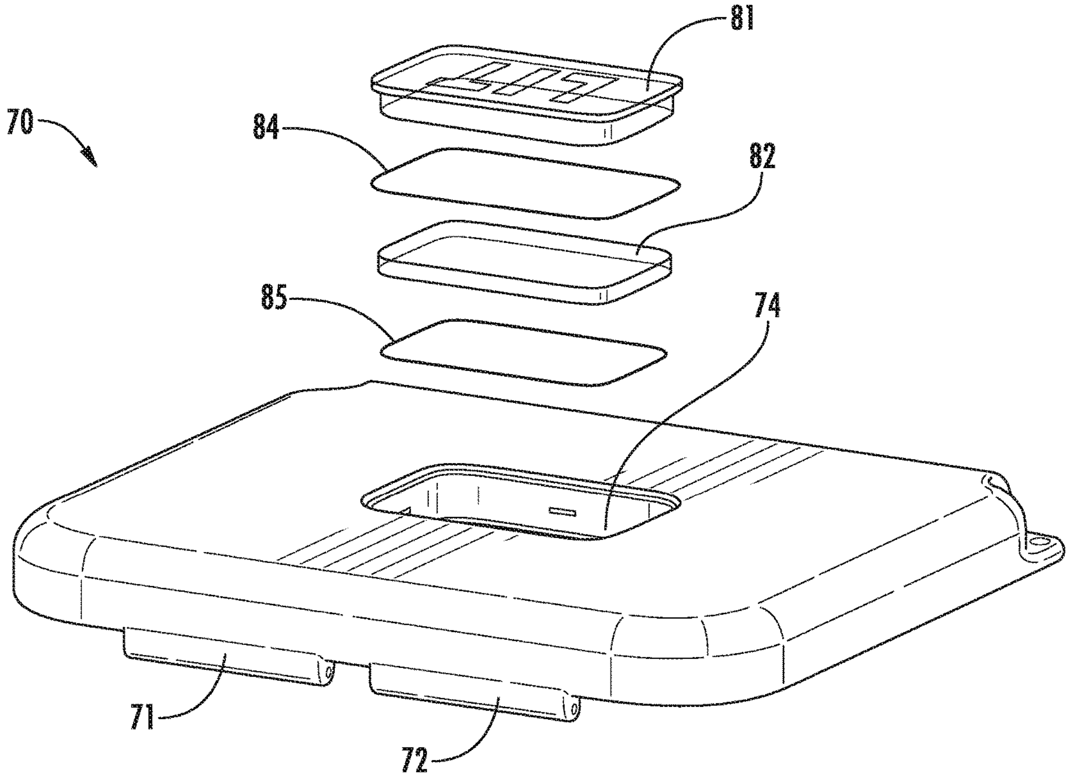
FIG. 14 is an exploded perspective view of the lid of FIG. 12.
Figure 15:
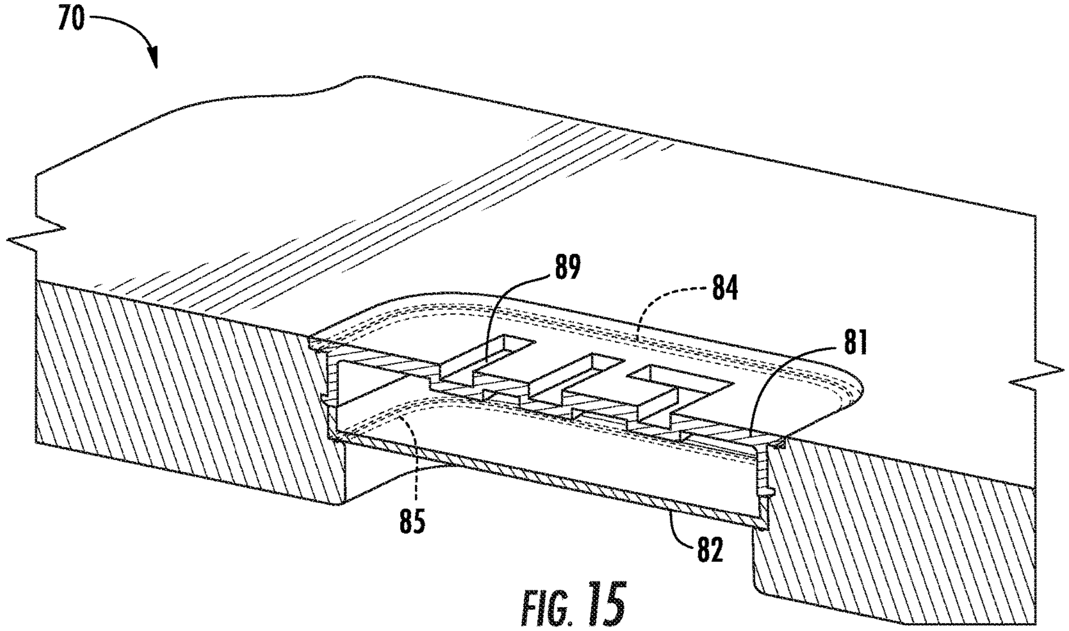
FIG. 15 is an enlarged partial perspective view of the lid of FIG. 12.
Figure 16:
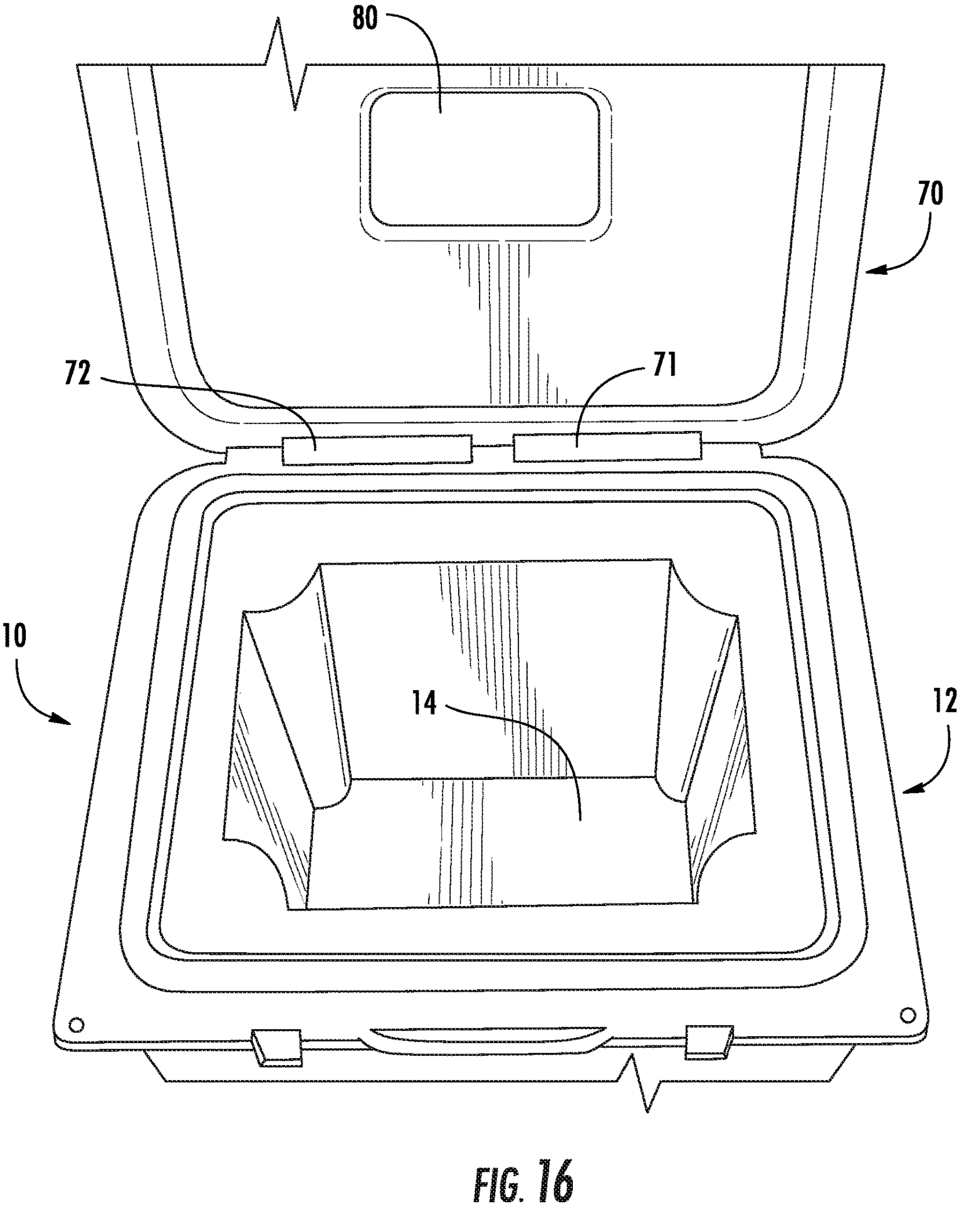
FIG. 16 is a perspective view of a container apparatus with a lid according to a preferred embodiment of the invention.

In an alternative embodiment, the apparatus 10 can include a lid 70, shown in FIGS. 12-16. The lid 70 can be pivotally attached to top of the sidewall 16 of the container 10 via two hinge members 71, 72, shown in FIGS. 14 and 16. The lid 70 can be operatively connected to the light assembly 50, so that the light assembly 50 comes on when the lid 70 is opened. Alternatively, the lid 70 can be operatively connected to the light assembly 50, such that the light assembly 50 comes on when the lid is closed. The lid 70 includes a center insert 80 positioned within a central opening 74 formed in the center of the lid 70, as shown in FIGS. 12-14. The center insert 80 and the central opening 74 can be substantially rectangular, as shown in FIGS. 12 and 14. The center insert 80 is comprised of an upper insert section 81 and a lower insert section 82, and two sealing rings 84, 85. The insert sections 81, 82 are made of a transparent or translucent material, such as polycarbonate plastic. The sealing rings 84, 85 are made of a sealing material, such as injection molded silicone. One sealing ring 84 is positioned along a recessed top edge of the central opening 74, below the top surface of the upper insert section 81, as shown in FIGS. 13 and 15. The other sealing ring 85 is positioned below the lower insert section 82 on a recessed ledge formed within the central opening 74, as shown in FIG. 13. Because the insert sections 81, 82 are translucent or transparent, light emitting from the light assembly 50 is visible through the insert section 80. A logo 89, shown as "LIT" in FIG. 12, can be engraved on the top surface of the upper insert section 81. The logo 89 can comprise any alphanumeric characters and/or graphics, such as a company name, trademark, sports team and/or school name or insignia. Light emitting from the light assembly 50 can shine through the insert 80 when the lid 70 is closed on the container 10, thereby illuminating the logo 89 and making it more visible. Alternatively, the insert section 80 can also include a light emitting device, such as a light emitting diode. It should be noted that while the lid 70 is described above as being a part of container 10, the lid 70 can also be used with other embodiments of the invention, including the container 100 described below.

Alternatively, the center insert 80 can be comprised of an audio speaker unit, such as a wireless audio speaker having wireless communications technology sold under the mark "BLUETOOTH". In another alternative embodiment, the center insert 80 can be a dry box container for holding personal items, such as keys, wallets and the like. The container can be made of rubber, plastic or other suitable material.

Figure 4:
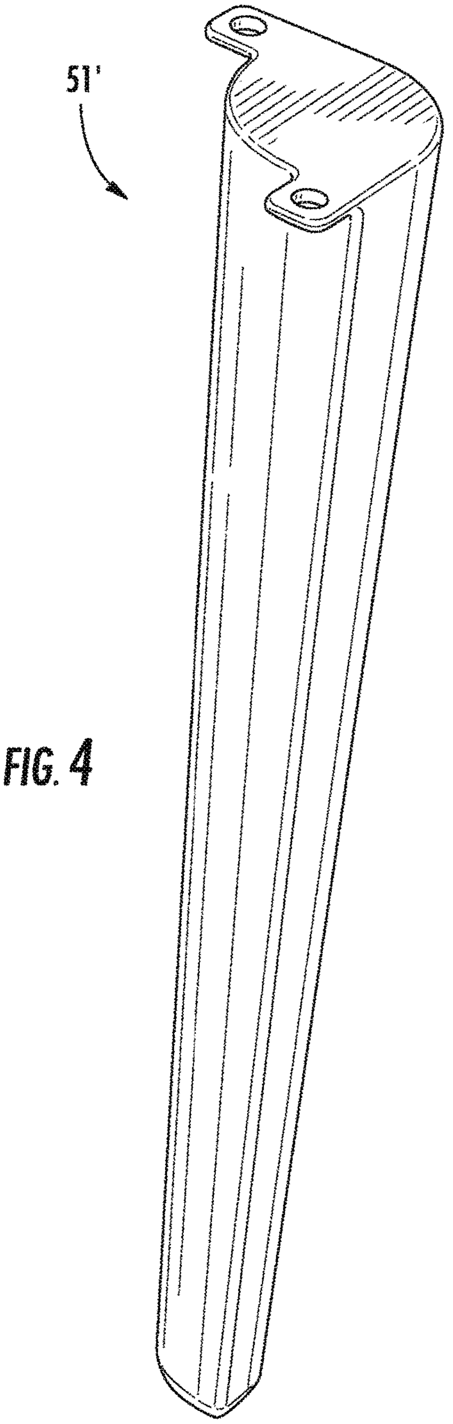
FIG. 4 is a perspective view of a light assembly according to another preferred embodiment of the invention.
Figure 5:
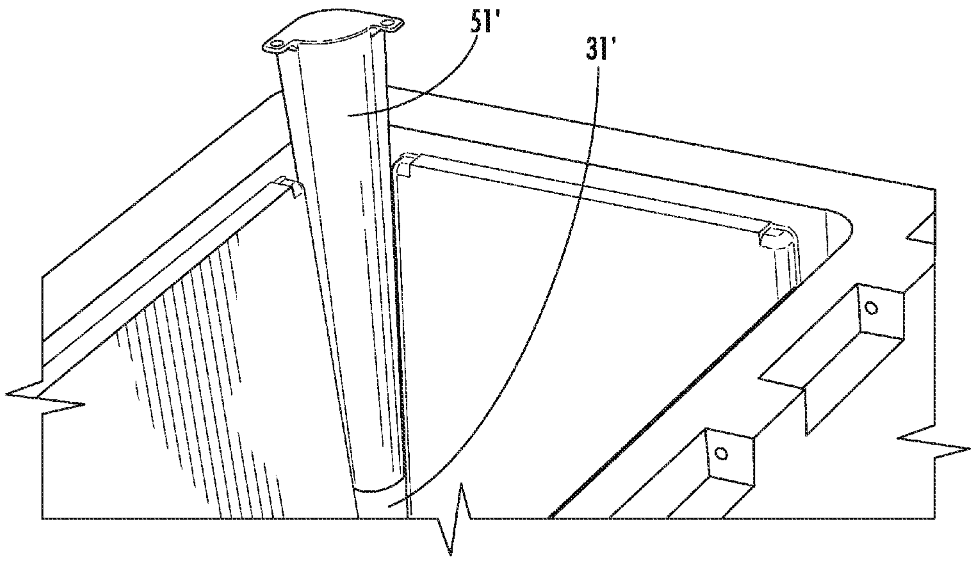
FIG. 5 is a partial perspective view of a container apparatus according to another preferred embodiment of the invention.
Figure 6:
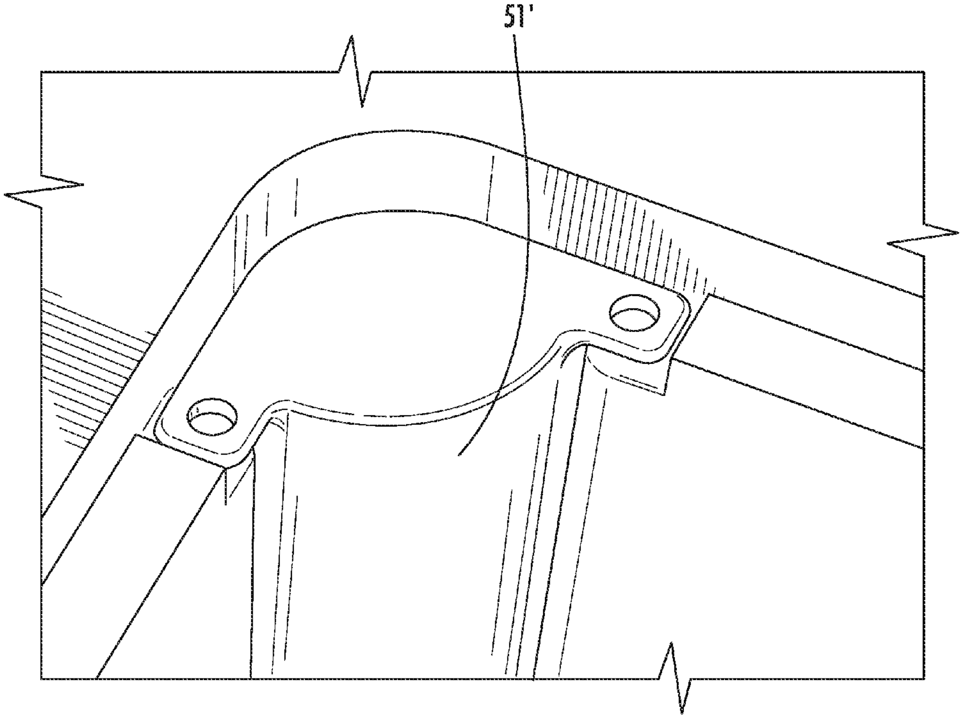
FIG. 6 is another partial perspective view of the container apparatus of FIG. 5.

In another preferred embodiment of the invention, shown in FIGS. 4-6, the light assembly comprises a plurality of separate elongate light members 51'. As such, the light assembly does not include a rectangular frame joining the light members 51' together, as in the previously described light assembly 50. In this alternative embodiment, each light member 51' is separately positioned into a recess 31', as shown in FIGS. 5 and 6.

Figure 7:
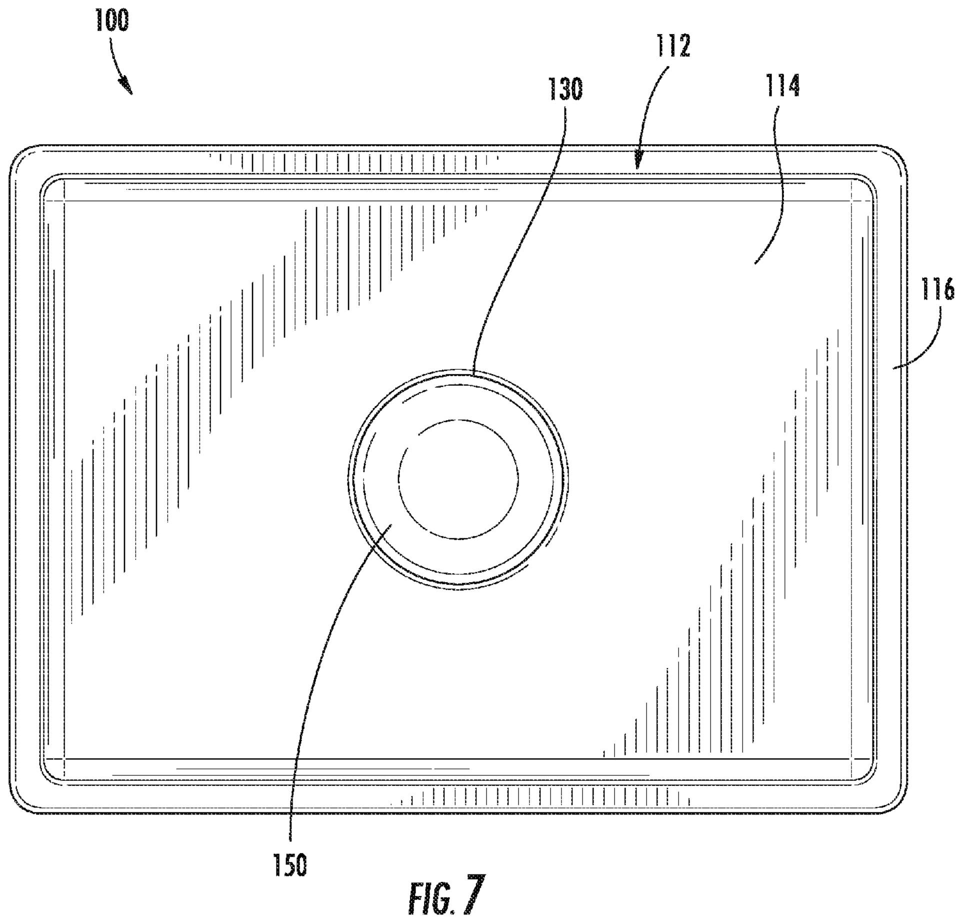
FIG. 7 is a top plan view of a container apparatus according to another preferred embodiment of the invention.

A container apparatus according to another preferred embodiment of the invention is illustrated in FIGS. 7-11, and shown generally at reference numeral 100. As shown in FIG. 7, the apparatus 100 comprises a container 112 and a light assembly 150.

Figure 8:
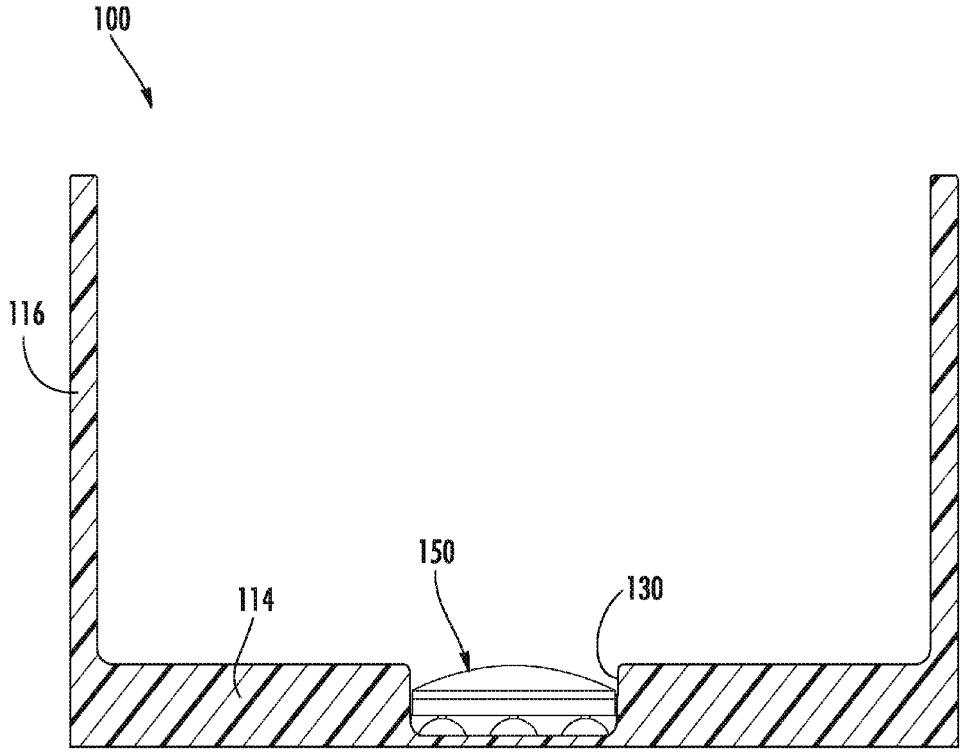
FIG. 8 is a side cross sectional view of the container apparatus of FIG. 7.

As shown in FIG. 7, the container 112 comprises a substantially rectangular base 114, and a substantially rectangular sidewall 116 extending upwardly from the base 14. A concave recess 130 is formed proximate the center of the base, as shown in FIG. 8. The recess 130 can have a circular shape, as shown in FIG. 7.

Figure 9:
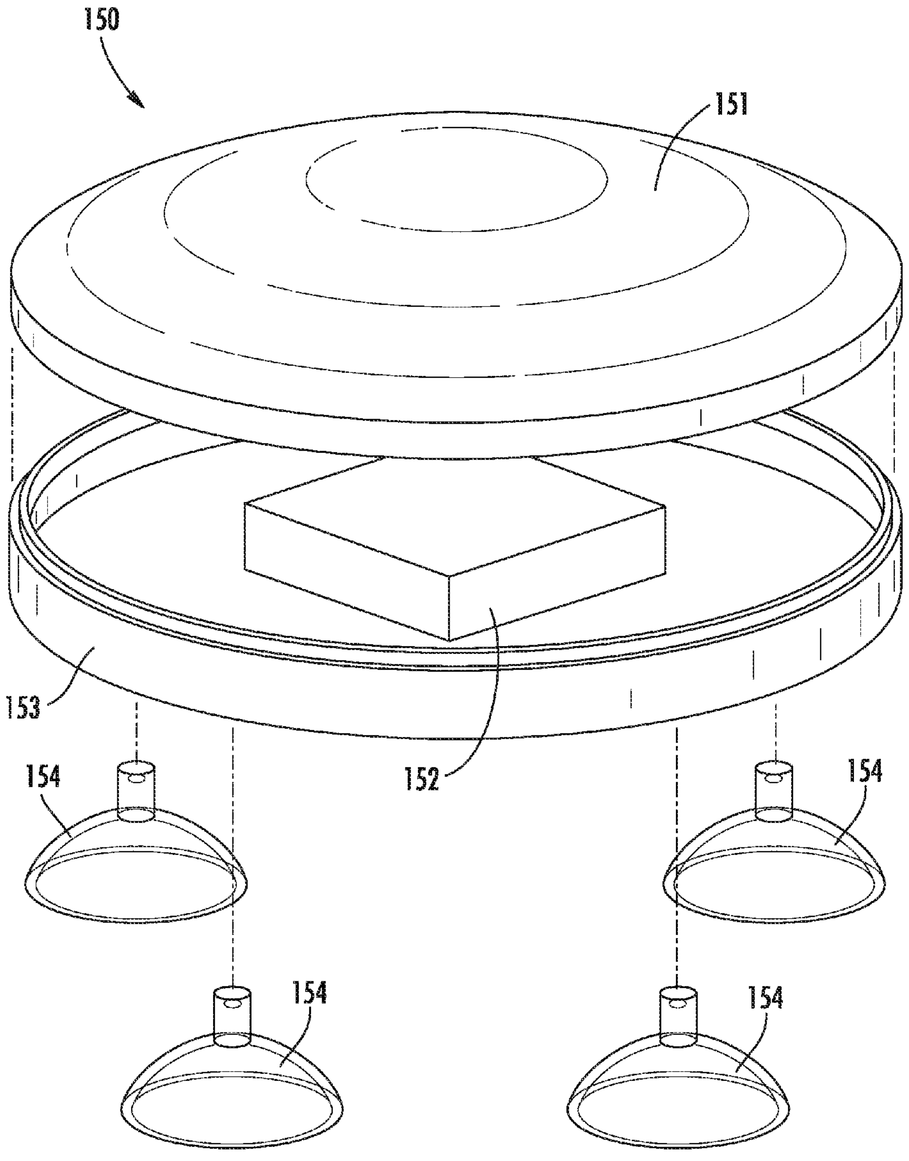
FIG. 9 is an exploded cross sectional view of a light assembly according to another preferred embodiment of the invention.
Figure 10:
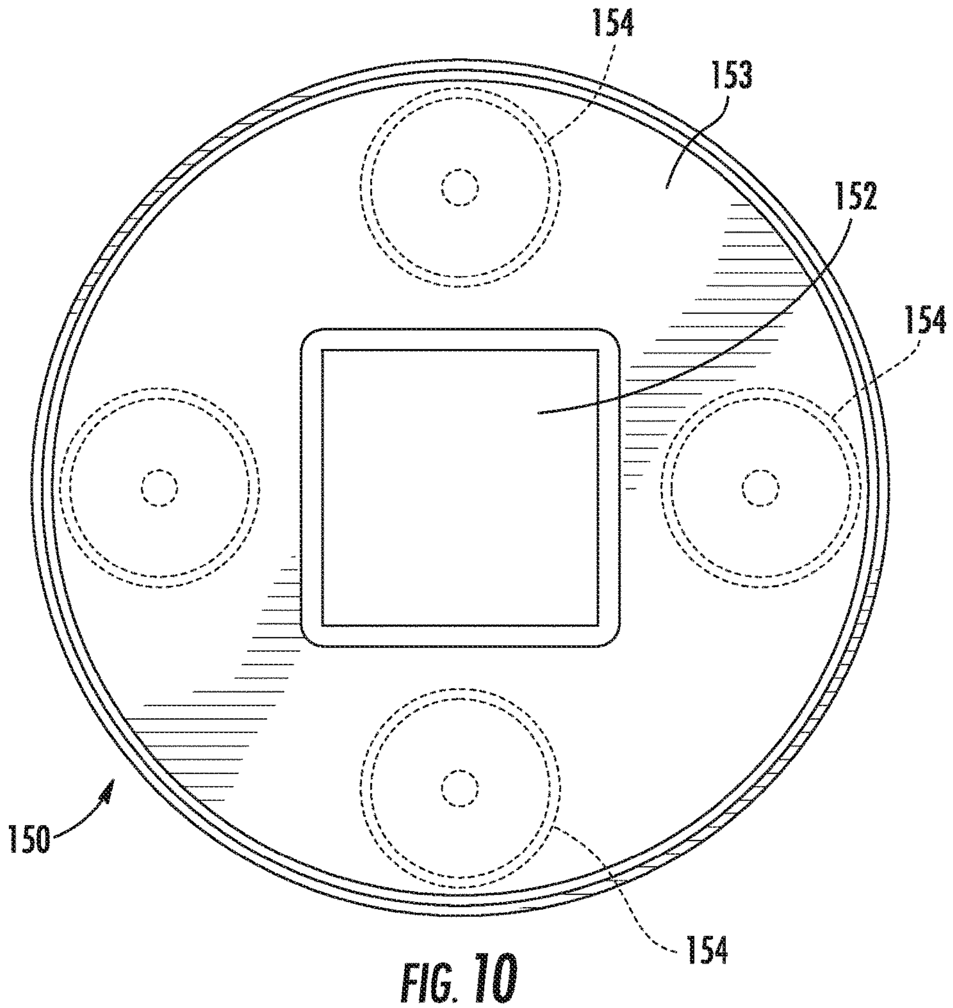
FIG. 10 is a top plan view of the light assembly of FIG. 9.
Figure 11:
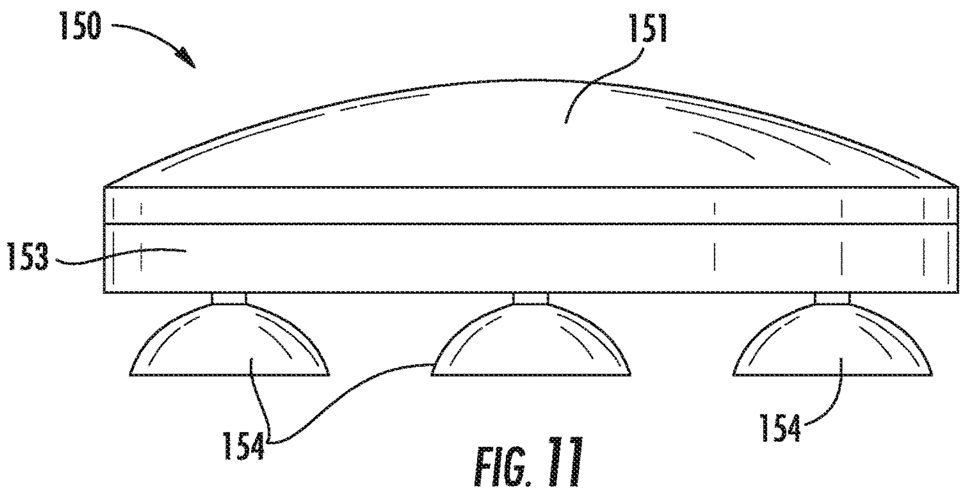
FIG. 11 is a side elevation of the light assembly of FIG. 9.

As shown in FIGS. 9-11, the light assembly 150 comprises a disc shaped light emitting member 151 containing a battery compartment 152, and a plurality of suction cups 154 attached to the base section 153 of the light emitting member 151. The light emitting member 151 can be comprised of any light emitting device, such as a light emitting diode (LED), an incandescent light bulb, or illuminated fiber optic cables.

As shown in FIG. 8, the light assembly 150 can be positioned within the circular recess 130 formed in the center of the base 114. Firmly pressing down on the light assembly 150 causes suction cups 154 to engage the base 114, and prevent the light assembly from coming out of the recess 130 during transport of the container 112.

Figure 17:
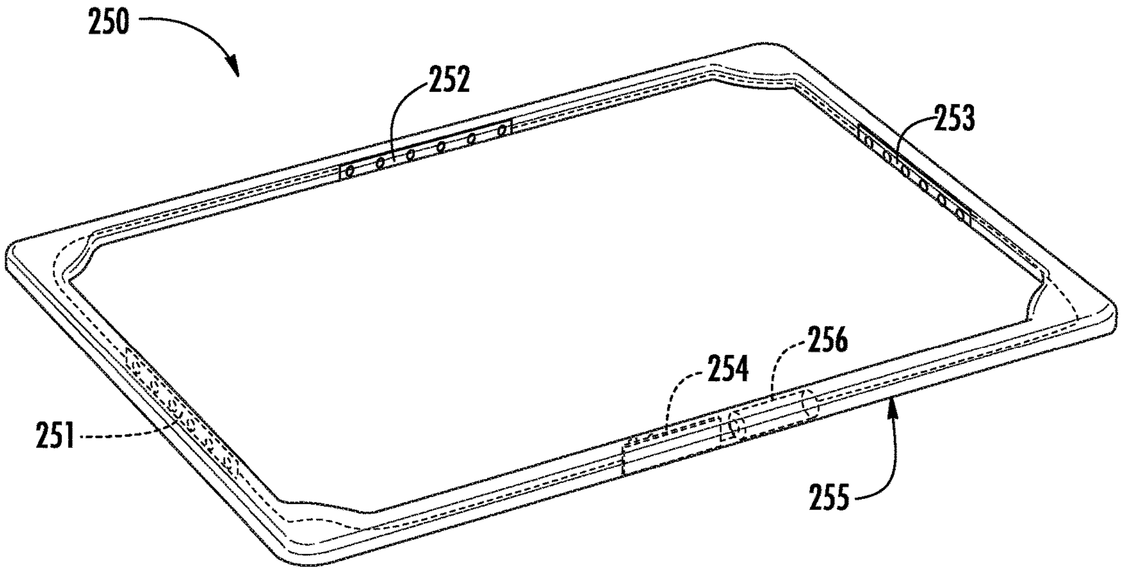
FIG. 17 is a perspective view of a light assembly insert according to another preferred embodiment of the invention.
Figure 18:
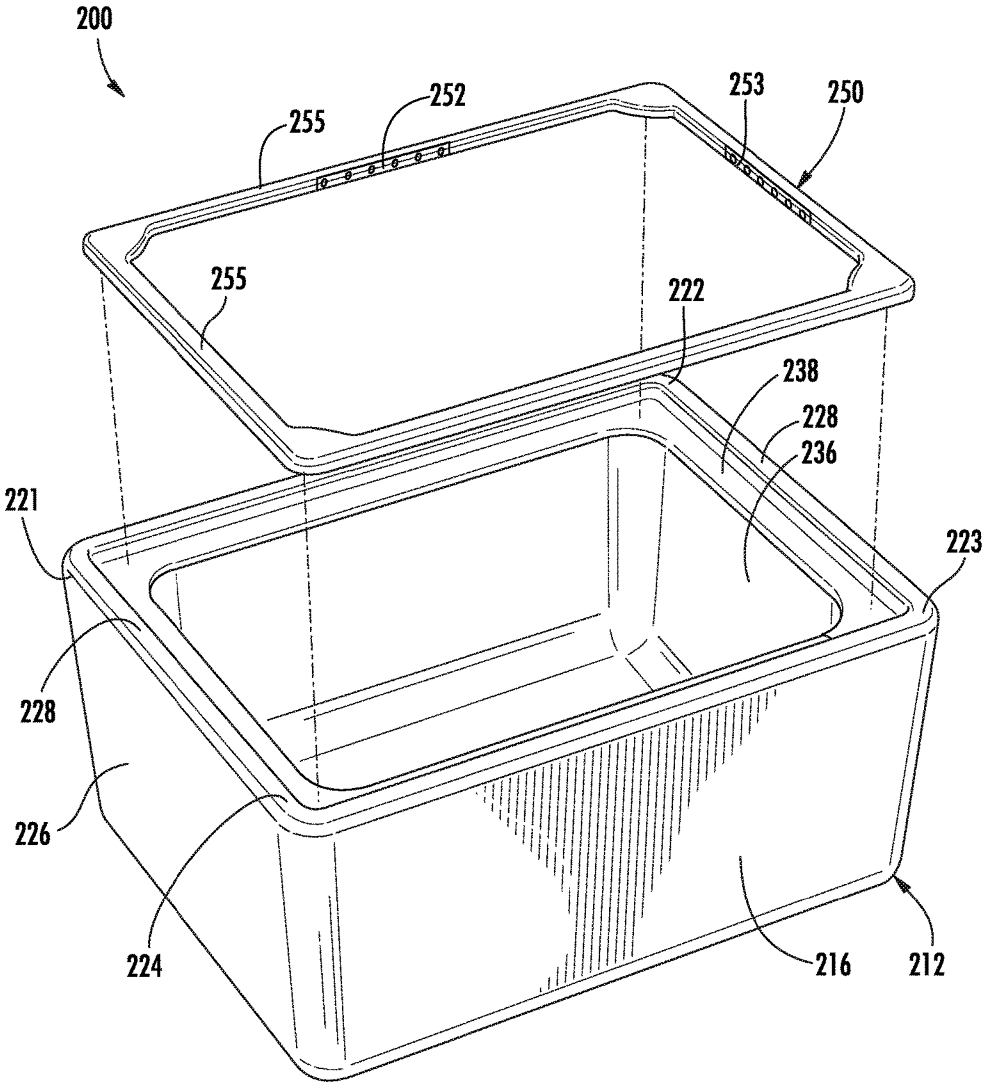
FIG. 18 is a perspective view of a container apparatus according to another preferred embodiment of the invention.
Figure 19:
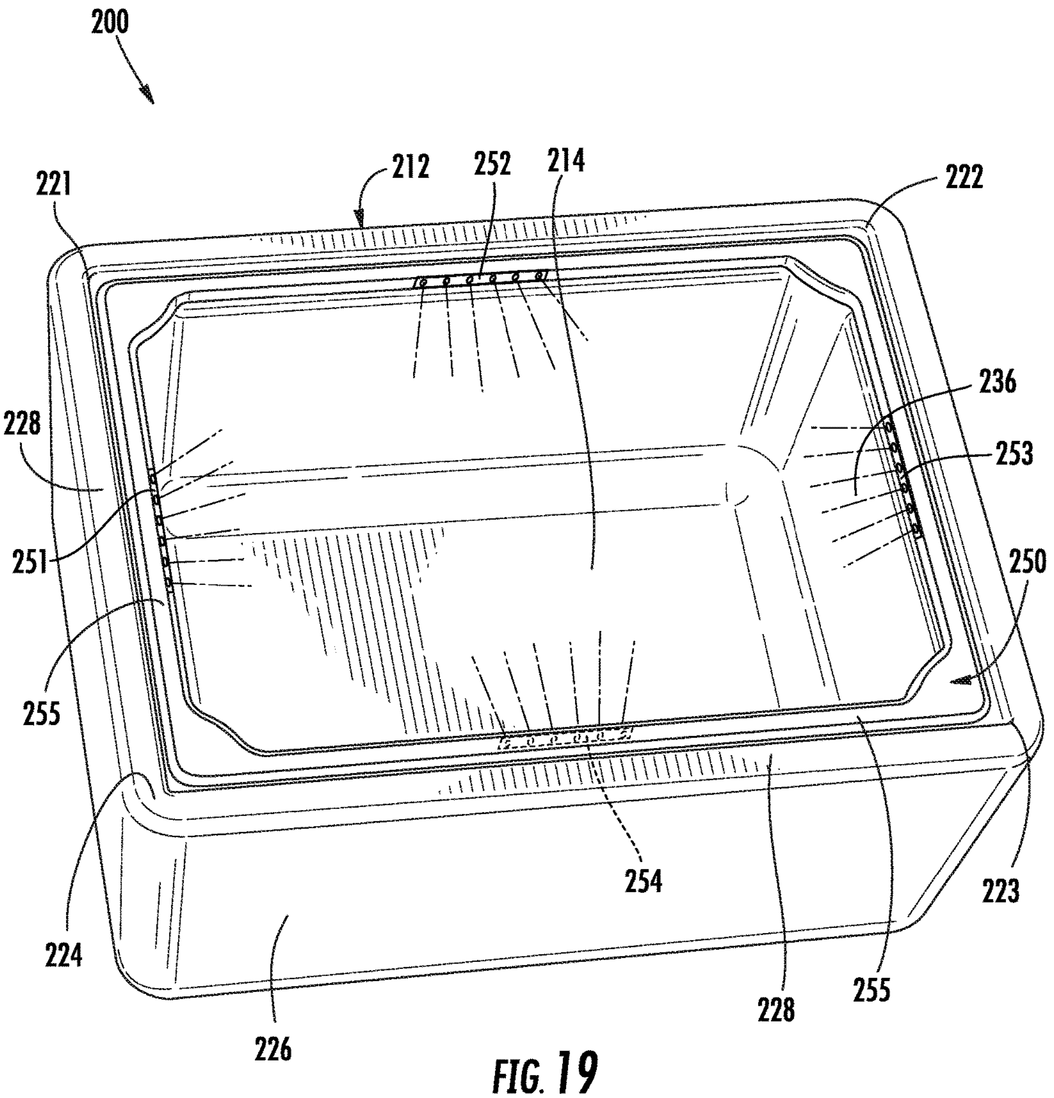
FIG. 19 is another perspective view of the container apparatus of FIG. 18.

A container apparatus according to another preferred embodiment of the invention is illustrated in FIGS. 17-19, and shown generally at reference numeral 200. As shown in FIG. 18, the apparatus 200 comprises a container 212 and a light assembly insert 250 that can be positioned within the container 212. The container 212 can be made of plastic or other suitable material, and can be made by injection molding or other suitable manufacturing process.

The light assembly insert 250 comprises a substantially rectangular frame 255, and a plurality of light emitting devices 251, 252, 253, 254 positioned in the frame 255 as shown in FIG. 17. The light emitting devices 251-254 can be comprised of light emitting diodes (LED). Alternatively, the light emitting devices 251-254 can comprise low-voltage incandescent light bulbs, illuminated fiber optic cables, or other suitable light emitting devices. The light assembly 250 can include a power source for powering the light emitting devices 251-254, such as a battery 256 housed within the frame 255 and operatively connected to the light emitting devices 251-254, as shown in FIG. 17.

The light assembly insert 250 can be positioned within a substantially concave recess formed in the interior surface of the container 212. As shown in FIGS. 18-19, the container 212 comprises a substantially rectangular base 214, and a substantially rectangular sidewall 216 extending upwardly from the base 214. The sidewall 216 has four sides defining four corners 221, 222, 223, 224. The sidewall 216 is comprised of an outer wall section 226 and an inner wall section 236, as shown in FIGS. 18 and 19. The top 238 of the inner wall section 236 is lower than the top 228 of the outer wall section 226, forming a substantially concave recess in the sidewall 216 defining a tiered rest platform 238, as shown in FIG. 18.

The rectangular frame 255 of the light assembly 250 has a perimeter approximately equal to the perimeter of the substantially rectangular rest platform 238. The rest platform 238 is sized and shaped to receive the light assembly 250 and support the light assembly 250 thereon, as shown in FIGS. 18 and 19. The light assembly frame 255 has a depth (or height) approximately equal to the difference in height between the top edge 228 of the outer wall section 226 and the top edge 238 of the inner wall section 236, such that the top of the frame 255 sits substantially flush with the top 228 of the outer wall section 226 when the light assembly 250 is positioned in the rest platform 238, as shown in FIG. 19.

As such, the light assembly 250 can be easily installed and removed from the container 212 depending on the needs or desires of the user. When the user wishes to illuminate the interior of the container 212, the light assembly 250 is positioned on the rest platform 238, as shown in FIG. 19. The light assembly 250 is securely retained within the rest platform 238 during movement of the container 212. When the user does not want to illuminate the interior of the container 212, the user can lift up on the light assembly 250 and remove it from the container 212.

Figure 20:
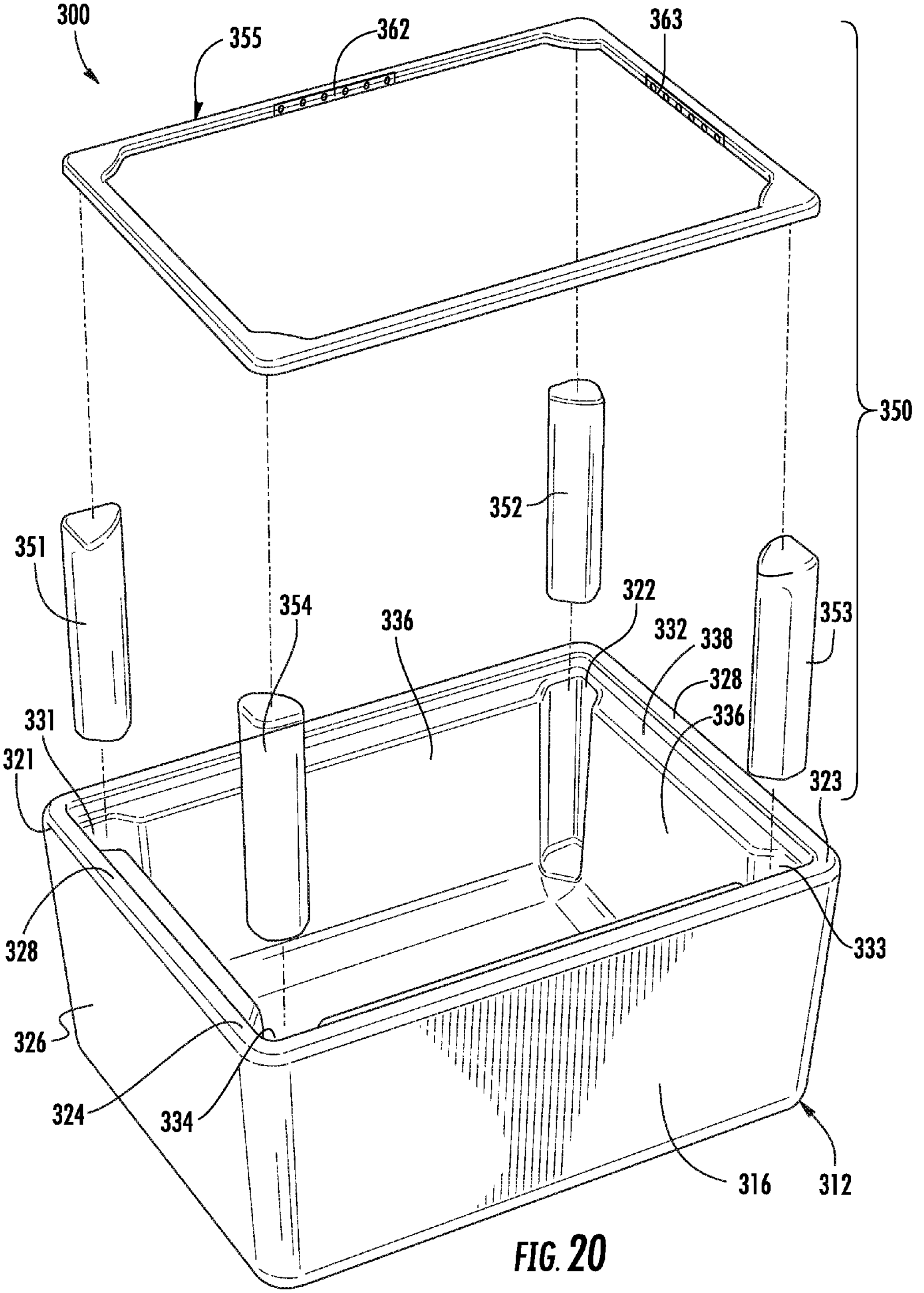
FIG. 20 is a perspective view of a container apparatus according to another preferred embodiment of the invention.
Figure 21:
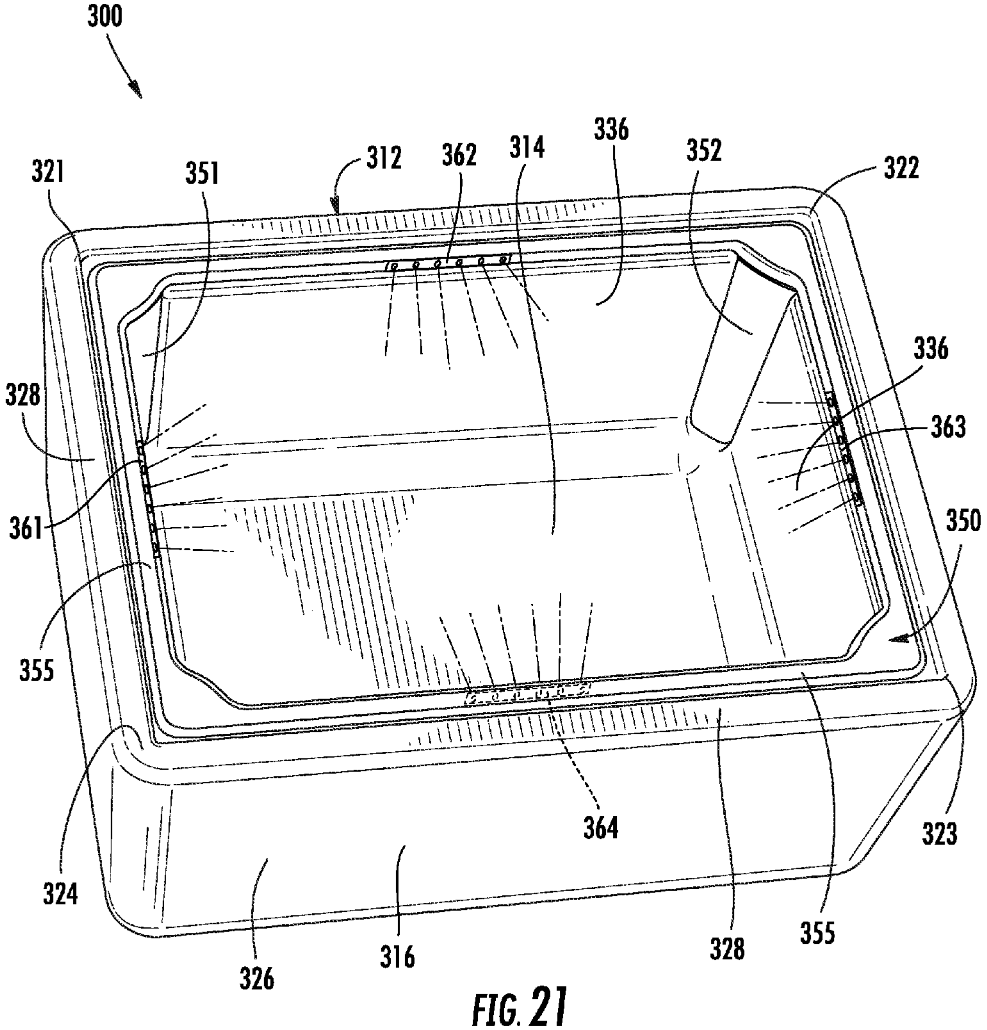
FIG. 21 is another perspective view the container apparatus of FIG. 20.

A container apparatus according to another preferred embodiment of the invention is illustrated in FIGS. 20 and 21, and shown generally at reference numeral 300. The container apparatus 300 comprises a container 312 having an interior surface that is adapted for receiving and releasably maintaining an insert assembly 350 therein. The container 312 can be made of plastic or other suitable material, and can be made by injection molding or other suitable manufacturing process.

As shown in FIGS. 20 and 21, the container 312 comprises a substantially rectangular base 314, and a substantially rectangular sidewall 316 extending upwardly from the base 314. The sidewall 316 has four sides defining four corners 321, 322, 323, 324. The sidewall 316 is comprised of an outer wall section 326 and an inner wall section 336, as shown in FIGS. 20 and 21. The surface of the base 314 and the surface of the inner wall section 336 define interior surfaces of the container 312. The top 238 of the inner wall section 236 is lower than the top 328 of the outer wall section 326, thereby creating a tiered rest platform 338, as shown in FIG. 20.

Four substantially concave and elongate recesses 331, 332, 333, 334 are formed in the inner wall section 336 proximate the four corners 321, 322, 323, 324, respectively, of the sidewall 316, as shown in FIG. 20. The recesses 331, 332, 333, 334 begin at the top 338 of the inner wall section 336 and extend downwardly to the base 314 of the container 312, as shown at reference numeral 332 in FIG. 20. The recesses 331, 332, 333, 334 can have a substantially pentagonal shape.

The insert assembly 350 comprises four elongate temperature altering members 351, 352, 353, 354, shown in FIG. 20. Each temperature altering member 351, 352, 353, 354 can be comprised of a vessel containing a refrigerant gel, such as a gel formulation comprised of propylene glycol and water or other suitable materials. Other refrigerant gel compositions are disclosed in U.S. Pat. No. 4,357,809, which is incorporated herein.

The elongate recesses 331, 332, 333, 334 in the container 312 are sized and shaped to conform to the elongate members 351, 352, 353, 354, in order to receive and retain the elongate members 351, 352, 353, 354 therein. Accordingly, elongate members 351, 352, 353, 354 have a length approximately equal to the length of the recesses 331, 332, 333, 334 extending from the top 338 of the inner wall section 336 to the base 314, and have a perimeter slightly less than the effective perimeter of the recesses 331, 332, 333, 334, such that the elongate members 351, 352, 353, 354 can be inserted into the recesses 331, 332, 333, 334, as shown in FIGS. 20 and 21, and retained within the recesses 331, 332, 333, 334 by frictional engagement.

Prior to being positioned into the container 312, the temperature altering members 351, 352, 353, 354 can be stored in a freezer or refrigerator. When the container 312 is to be used to keep items cool, the elongate members 351, 352, 353, 354 are removed from the freezer/refrigerator and positioned into the elongate recesses 331, 332, 333, 334 of the container 312, as described above. As such, the cooled elongate members 351, 352, 353, 354 cool the interior surface and interior area of the container 312, thereby helping to maintain the stored items at a cooler temperature for a longer period of time. Alternatively, the temperature altering members 351, 352, 353, 354 can comprise a heating gel, such as gels that can be heated in the microwave typically used in heating packs. Each member 351, 352, 353, 354 comprises a vessel made of material such as plastic that is safe for placement in a microwave. As such, the heated elongate members 351, 352, 353, 354 can heat the interior area of the container 312 to maintain the stored items at a warmer temperature for a longer period of time. In yet another alternative embodiment, the elongate members 351, 352, 353, 354 comprise a gel material that can be used for both heating and cooling. As such, the user can selectively use the elongate members 351, 352, 353, 354 for cooling by storing them in a freezer or refrigerator prior to use, or use the members 351, 352, 353, 354 for heating by heating the members 351, 352, 353, 354 in a microwave before use.

The insert assembly 350 comprises a substantially rectangular top frame 355 having a plurality of light emitting devices 361, 362, 363, 364 positioned in the frame 355 as shown in FIGS. 20 and 21. The light emitting devices 361-364 can be comprised of light emitting diodes (LED). Alternatively, the light emitting devices 361-364 can comprise low-voltage incandescent light bulbs, illuminated fiber optic cables, or other suitable light emitting devices. The frame 355 can include a power source for powering the light emitting devices 361-364, such as a battery housed within the frame 355 and operatively connected to the light emitting devices 361-364, as shown in FIG. 17.

As shown in FIGS. 20 and 21, the top 338 of the inner wall section 336 is lower than the top 328 of the outer wall section 326, forming a substantially concave recess in the sidewall 316 defining a tiered rest platform 338, as shown in FIG. 20. The rectangular frame 355 of the light assembly 350 has a perimeter approximately equal to the perimeter of the substantially rectangular rest platform 338. The rest platform 338 is sized and shaped to receive the frame 350 and support the frame 350 thereon, as shown in FIGS. 20 and 21. The frame 355 has a depth (or height) approximately equal to the difference in height between the top edge 328 of the outer wall section 326 and the top edge 338 of the inner wall section 336, such that the top of the frame 355 sits substantially flush with the top 328 of the outer wall section 326 when the frame 355 is positioned in the rest platform 338, as shown in FIG. 21. As such, the interior of the container 312 can be illuminated by the light emitting devices 361-364 of the top frame 355, and the interior of the container 312 can be cooled or heated by the temperature altering members 351, 352, 353, 354.

Figure 22:
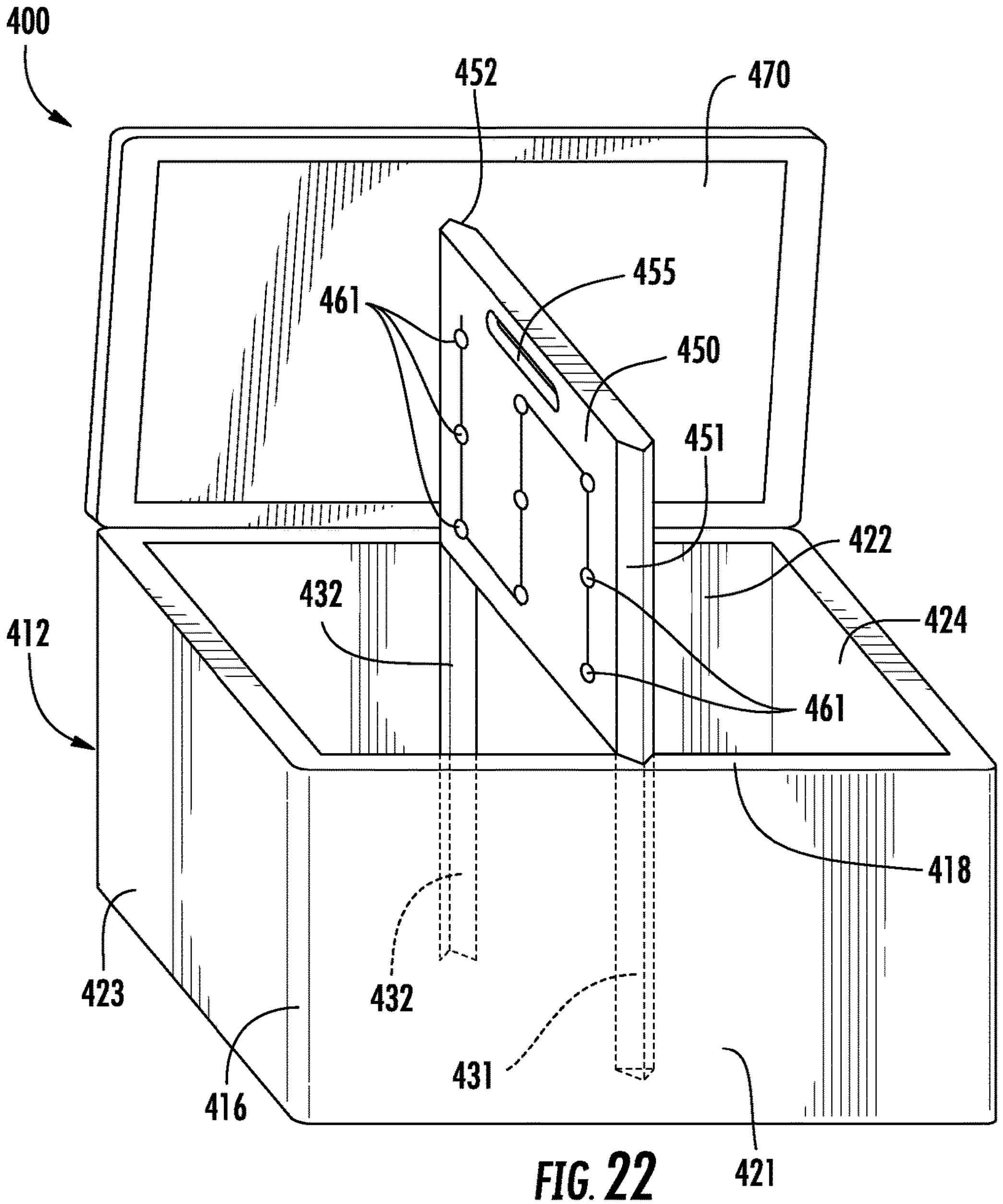
FIG. 22 is a perspective view of a container apparatus according to another preferred embodiment of the invention.
Figure 23:
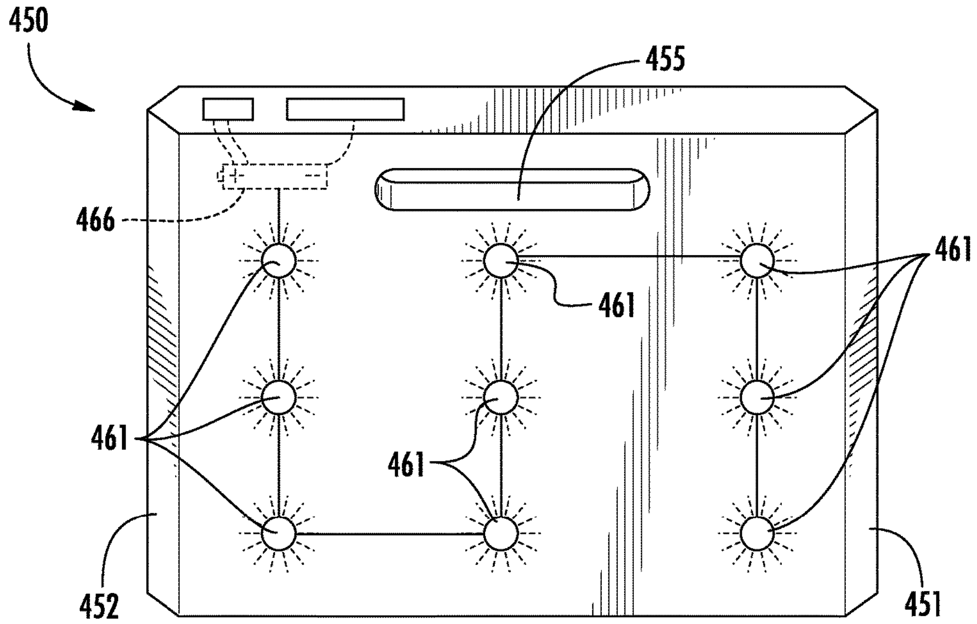
FIG. 23 is a front elevation view of a light assembly insert according to anther preferred embodiment of the invention.
Figure 24:
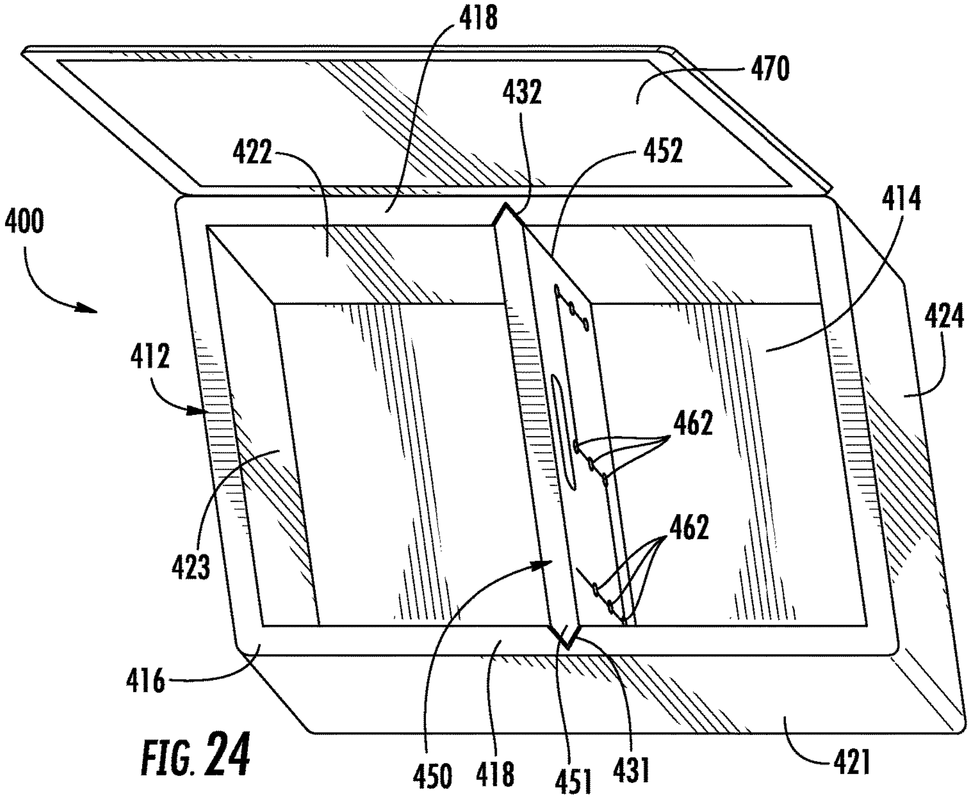
FIG. 24 is a top perspective view of the container apparatus of FIG. 22.

A container apparatus according to another preferred embodiment of the invention is illustrated in FIGS. 22-24, and shown generally at reference numeral 400. The apparatus 400 comprises a container body 412, and a light assembly insert 450. A lid 470 can be connected to the container body 412. The container body 412 and the lid 470 can be made of plastic or other suitable material, and can be made by injection molding or other suitable manufacturing process.

The container body 412 comprises a substantially rectangular base 414 for positioning substantially horizontally on a floor surface, and a substantially rectangular sidewall 416 extending substantially vertically from the base 414. The sidewall 416 has four sides 421, 422, 423, 424. Two substantially concave and elongate recesses 431, 432 are formed in the interior surface on opposing sides 401, 402 of the sidewall 416, as shown in FIG. 22. The recesses 431, 432 define channels beginning at the top edge 418 of the sidewall 416 and extending downwardly to the base 414 of the container 412, as shown in FIG. 22. The channels 431, 432 extend substantially vertically, and are substantially perpendicular to the container base 414.

As shown in FIGS. 22-24, the insert 450 comprises a substantially flat and rectangular member having a first group of light emitting devices 461 positioned on one side of the insert 450, and a second group of light emitting devices 462 positioned on the opposite side of the insert 450. The light emitting devices can comprise light emitting diodes (LED), a low-voltage incandescent light bulb, illuminated fiber optic cables, or other suitable light emitting devices. A power source such as a battery 466 can be positioned within the insert 450 and operatively connected to the light emitting devices 461, 462.

The recessed channels 431, 432 are shaped and sized to receive and conform to the side edges 451, 452 of the light assembly insert 450 and are positioned in opposed complementary alignment, as shown in FIGS. 22 and 24, such that the side edges 451, 452 can slide up and down within the channels 431. As shown in FIG. 22, the insert side edges 451, 452 and the recessed channels 431, 432 can have a substantial arrow head shape. The insert 450 can include an opening 455 formed therein through which the user can grasp the light assembly 450. Alternatively, the insert 450 can include a temperature altering element, such as a refrigerant gel. The refrigerant gel can be a gel formulation comprised of propylene glycol and water or other suitable materials.

When the user wishes to illuminate the interior of the container body 412, the insert 450 is slid down the recessed channels 431, 432 until the bottom edge of the insert 450 rests on the base 414 of the container body 412. The insert 450 is retained in an upright position within the channels 451, 452, as shown in FIG. 24. As such, the light emitting devices 461, 462 of the insert 450 can illuminate the interior of the container body 412. In addition, the insert 450 acts as a divider that separates the interior of the container body 412 into two separate sections, as shown in FIG. 24. When desired, the insert 450 can be easily removed by grasping through the opening 455 and lifting the insert 450 upwardly out of the recessed channels 431, 432.

It is to be noted that while the container apparatus 400 is described and shown in the drawings as having a substantially rectangular container body 412, the invention is not so limited. Alternatively, the container body 412 can be a variety of shapes, such as substantially circular, oval and square.

Figure 25:
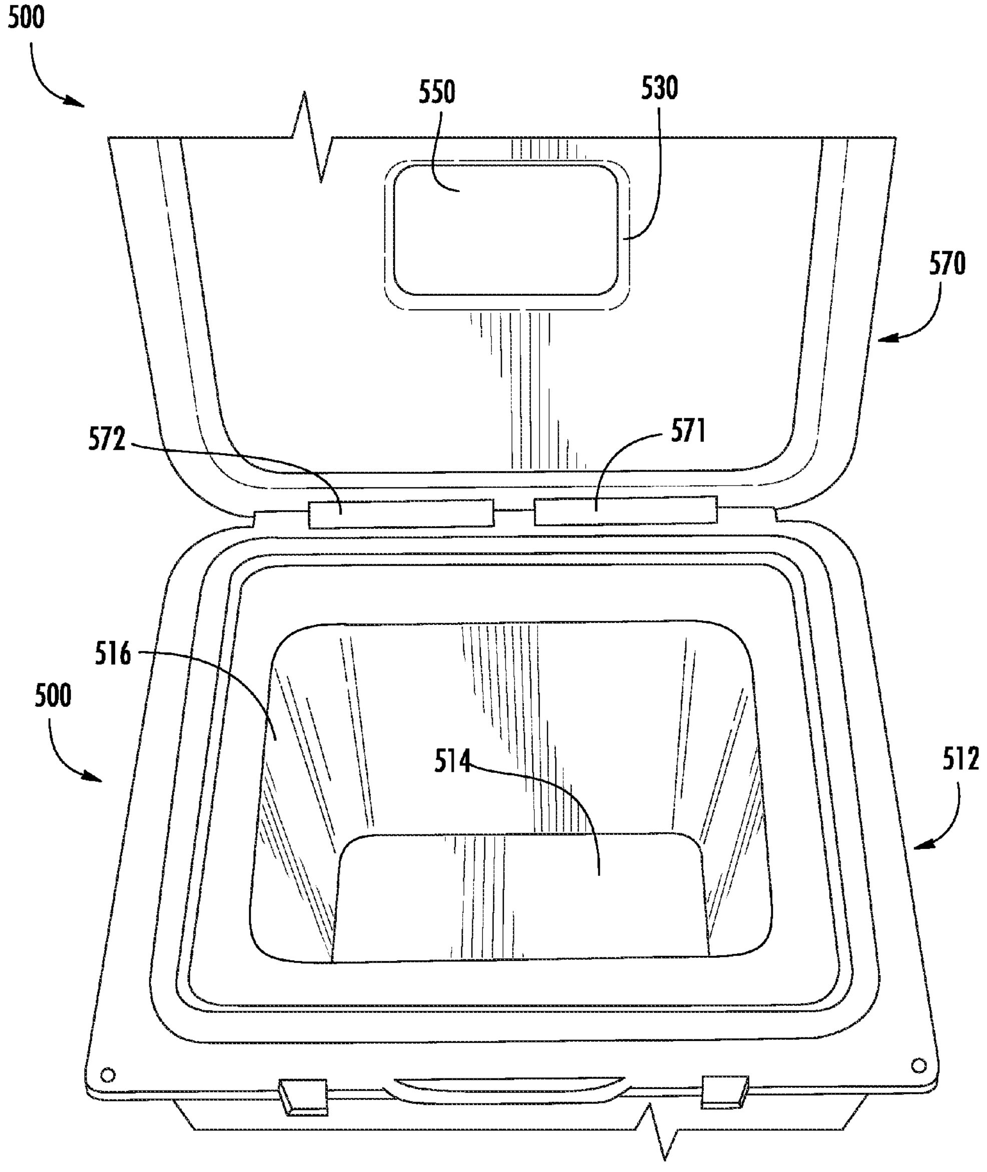
FIG. 25 is a perspective view of a container apparatus according to another preferred embodiment of the invention.

A container apparatus according to another preferred embodiment of the invention is illustrated in FIG. 25, and shown generally at reference numeral 500. As shown in FIG. 25, the apparatus 500 comprises a substantially rectangular body section 512, a lid section 570 connected to the body 512, and an insert assembly 550. The body 512 comprises a substantially rectangular base 514 and a substantially rectangular sidewall 516 extending upwardly from the base. The lid 570 can be pivotally attached to the sidewall 516 of the body 512 by hinges 571, 572. The body 512 and the lid 570 define an enclosure in which items such as food and beverages can be stored. The apparatus 500 can be made of plastic or other material suitable for a thermally insulated cooler.

The insert assembly 550 can be positioned within a substantially concave recess 530 formed in the interior surface of the lid 570, as shown in FIG. 25. The recess 530 is sized and shaped to conform to the size and shape of the light assembly 550 so as to receive and retain the light assembly 550 therein by frictional engagement. Alternatively, the insert assembly 550 can be held within the recess 530 by other attachment means, such as suction cups or adhesive. As shown in FIG. 25, the insert assembly 550 and the recess 530 can be substantially rectangular. Alternatively, the insert assembly 550 and the recess 530 can be other shapes, such as circular or oval.

The insert assembly 550 can comprise at least one light emitting device, such as a light emitting diode (LED), a low-voltage incandescent light bulb, illuminated fiber optic cables, or other suitable light emitting device. Whenever it is desired to illuminate the interior of the container 500, the insert assembly 550 can be positioned within the recess 530 and the light emitting device turned on. Alternatively, the insert assembly 550 can include a battery powered cooling or heating element. In another alternative embodiment, the insert assembly 550 can be comprised of an audio speaker unit, such as a wireless audio speaker having wireless communications technology sold under the mark "BLUETOOTH". In yet another alternative embodiment, the insert assembly 550 can be a dry box container for holding personal items, such as keys, wallets and the like. The container can be made of rubber, plastic or other suitable material.

It should be noted that the invention is not limited to the embodiments described above. In particular, the light assembly of the invention can be a variety of sizes and shapes, and the container can have one or more recesses sized and shaped to compliment the particular size and shape of the light assembly and facilitate insertion of the light assembly into the container. For example, the light assembly can comprise one or more rectangular panels containing light emitting devices that are inserted into one more recesses in the container. Also, while particular embodiments of the invention described comprise substantially rectangular containers, the invention is not so limited. Containers of the invention can be of a variety of shapes, including substantially square, circular and oval. U.S. Provisional Application Ser. No. 61/204,016, filed Jan. 2, 2009, titled "LIGHTED ENCLOSURE ASSEMBLY", is incorporated herein by reference.

A container apparatus and a method of using same are described above. Various changes can be made to the invention without departing from its scope. The above description of the preferred embodiments and best mode of the invention are provided for the purpose of illustration only and not limitation—the invention being defined by the claims and equivalents thereof.

What is claimed is:

1. A container apparatus comprising an enclosure defining an interior area and a light assembly adapted for illuminating the interior area, the enclosure having an interior surface and a substantially concave recess formed in the interior surface adapted for receiving and maintaining the light assembly therein, wherein the enclosure comprises:

(a) a body section comprising a substantially rectangular base and a substantially rectangular sidewall extending upwardly from the base;

(b) a lid section pivotally connected to the sidewall of the body section; and (c) wherein the substantially concave recess comprises a substantially concave cavity recessed within an interior surface of the body section or the lid section.

2. The container apparatus according to claim 1, wherein the light assembly comprises at least one light emitting device selected from the group consisting of a light emitting diode, an incandescent light bulb, and an illuminated fiber optic cable.

3. The container apparatus according to claim 1, wherein the substantially concave cavity is recessed within the interior surface of the body section.

4. The container apparatus according to claim 1, wherein the substantially concave recess comprises a first concave channel formed in an interior surface of the substantially rectangular sidewall and a complementary second concave channel formed in the interior surface of the substantially rectangular sidewall at a position opposed to the first channel, the first channel and the second channel extending substantially vertically from proximate a top of the substantially rectangular sidewall to proximate a bottom of the substantially rectangular sidewall.

5. The container apparatus according to claim 4, wherein the light assembly comprises a substantially flat member received in the first channel and the second channel and adapted for sliding movement therein, whereby the light assembly can provide a barrier dividing the interior area defined by the enclosure into a first interior area and a second interior area.

6. The container apparatus according to claim 5, wherein the substantially rectangular sidewall comprises first and second opposed sides and third and fourth opposed sides, wherein the first channel is formed in the first side and the second channel is formed in the second side.

7. The container apparatus according to claim 1, wherein the substantially concave cavity is recessed within the interior surface of the lid section.

8. A container apparatus comprising an enclosure defining an interior area and a light assembly adapted for illuminating the interior area, the enclosure having an interior surface and a substantially concave recess formed in the interior surface adapted for receiving and maintaining the light assembly therein, wherein the enclosure comprises a body section comprising a substantially rectangular base and a substantially rectangular sidewall extending upwardly from the base and having a top edge, and further wherein the substantially concave recess is formed in the top edge of the sidewall.

9. The container apparatus according to claim 8, wherein the light assembly comprises a substantially rectangular frame adapted for positioning in the recess formed in the top edge of the sidewall, and at least one light emitting device positioned within the frame.

10. The container apparatus according to claim 8, wherein the enclosure further comprises a lid section pivotally connected to the top edge of the substantially rectangular sidewall.

11. The container apparatus according to claim 8, wherein the light assembly comprises at least one light emitting device selected from the group consisting of a light emitting diode, an incandescent light bulb, and an illuminated fiber optic cable.

12. A container apparatus comprising a thermally insulated cooler and an insert assembly, the thermally insulated cooler comprising an enclosure defining an interior area and comprising an interior surface and at least one substantially concave recess formed in the interior surface adapted for receiving and maintaining the insert assembly therein, the insert assembly comprising at least one temperature altering element comprising at least one selected from the group consisting of a cooling element adapted for cooling the interior area of the enclosure and a heating element adapted for heating the interior area of the enclosure, wherein the at least one temperature altering element comprises a refrigerant gel comprising propylene glycol.

13. The container apparatus according to claim 12, wherein the insert assembly further comprises at least one selected from the group consisting of a light emitting device adapted for illuminating the interior area of the enclosure, an audio speaker adapted for emitting sound, and a container adapted for storing items.

14. The apparatus according to claim 12, wherein the enclosure comprises a base, a sidewall extending upwardly from the base, and a lid pivotally connected to the sidewall, and the at least one substantially concave recess is integrally formed within at least one of the base, the sidewall and the lid.

15. The container apparatus according to claim 12, wherein the insert assembly further comprises at least one light emitting device selected from the group consisting of a light emitting diode, an incandescent light bulb, and an illuminated fiber optic cable.

16. A container apparatus comprising:

(a) an enclosure defining an interior area and comprising an interior surface and at least one substantially concave recess formed in the interior surface adapted for receiving and maintaining an insert assembly therein, wherein the enclosure comprises a body comprising a substantially rectangular base and a substantially rectangular sidewall extending upwardly from the base defining four corners of the body, and wherein the at least one recess comprises four recesses formed at said four corners; and (b) an insert assembly comprising four elongate insert members positioned within the four recesses, wherein each of said four elongate insert members comprises at least one temperature altering element comprising at least one selected from the group consisting of a cooling element adapted for cooling the interior area of the enclosure and a heating element adapted for heating the interior area of the enclosure.

17. The container apparatus according to claim 16, wherein the enclosure further comprises a lid pivotally connected to the body.

18. The container apparatus according to claim 16, wherein the insert assembly further comprises a substantially rectangular insert member positioned above the four elongate insert members and supported by a top edge of the sidewall, the substantially rectangular insert member comprising at least one light emitting device adapted for illuminating the interior area of the enclosure.

19. The container apparatus according to claim 16, wherein the at least one temperature altering element comprises a refrigerant gel comprising propylene glycol.

20. The container apparatus according to claim 16, wherein the insert assembly further comprises at least one selected from the group consisting of a light emitting device adapted for illuminating the interior area of the enclosure, an audio speaker adapted for emitting sound, and a container adapted for storing items.

* * * * *